United States Patent
Wu et al.

(10) Patent No.: US 11,758,363 B2
(45) Date of Patent: Sep. 12, 2023

(54) SIDELINK-ASSISTED CELLULAR-BASED POSITIONING

(71) Applicant: QUALCOMM Incorporated, San Diego, CA (US)

(72) Inventors: Shuanshuan Wu, San Diego, CA (US); Hong Cheng, Basking Ridge, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/318,804

(22) Filed: May 12, 2021

(65) Prior Publication Data

US 2022/0369065 A1 Nov. 17, 2022

(51) Int. Cl.
| | |
|---|---|
| H04W 24/00 | (2009.01) |
| H04W 4/029 | (2018.01) |
| H04W 4/02 | (2018.01) |
| H04W 4/20 | (2018.01) |
| H04W 4/44 | (2018.01) |

(52) U.S. Cl.
CPC .......... *H04W 4/029* (2018.02); *H04W 4/023* (2013.01); *H04W 4/20* (2013.01); *H04W 4/44* (2018.02)

(58) Field of Classification Search
CPC ....... H04W 4/029; H04W 4/023; H04W 4/20; H04W 4/44
See application file for complete search history.

(56) References Cited

U.S. PATENT DOCUMENTS

| | | | |
|---|---|---|---|
| 9,713,117 B2 | 7/2017 | Khoryaev et al. | |
| 2015/0111560 A1* | 4/2015 | Rogitz | H04M 1/72463 455/418 |
| 2020/0327343 A1* | 10/2020 | Lund | H04W 4/46 |

FOREIGN PATENT DOCUMENTS

| | | | |
|---|---|---|---|
| WO | 02078382 A1 | 10/2002 | |
| WO | 2019145095 A1 | 8/2019 | |
| WO | WO-2020231303 A1 * | 11/2020 | ............. G01S 11/06 |

OTHER PUBLICATIONS

Institute for Information Industry (III): "Enhanced OTDOA Positioning Algorithm with Legacy UE Support", 3GPP TSG RAN WG1 Meeting #81, R1-153151, 3rd Generation Partnership Project (3GPP), Mobile Competence Centre, 650, Route Des Lucioles, F-06921 Sophia, vol. RAN WG1, No. Fukuoka, May 25, 2015-May 29, 2015, May 24, 2015, XP050971285, 3 Pages, chapters 1, 2, figures 1, 2.
International Search Report and Written Opinion—PCT/US2022/028701—ISA/EPO—dated Sep. 28, 2022.

* cited by examiner

*Primary Examiner* — Erika A Washington
(74) *Attorney, Agent, or Firm* — QUALCOMM Incorporated

(57) ABSTRACT

Methods, systems, and devices for wireless communications are described. A base station may receive positioning information for a first user equipment (UE), the first UE supporting sidelink communications via a sidelink interface with one or more roadside units. The base station may identify that a second UE is associated with the first UE, the association between the first UE and the second UE satisfying a threshold and the second UE supporting sidelink-assisted positioning. The base station may provide, to a network entity, a message indicating the positioning information for the first UE and identifying the first UE and the second UE.

22 Claims, 21 Drawing Sheets

SIDELINK-ASSISTED CELLULAR-BASED POSITIONING

FIELD OF TECHNOLOGY

The following relates to wireless communications, including sidelink-assisted cellular-based positioning.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support sidelink-assisted cellular-based positioning. Generally, the described techniques provide for a sidelink-assisted cellular positioning operations. That is, a vehicle user equipment (V-UE), which may communicate via sidelink, may be associated with a traditional, cellular UE (C-UE), such as the C-UE riding within a vehicle equipped with V-UE. Based on the association, the positioning information for the V-UE may be used during the cellular positioning operations of the C-UE. For example, a base station and/or the C-UE may receive or otherwise identify positioning information for the V-UE based on its association with the C-UE satisfying a threshold. For example, the threshold may be based on the two UE traveling together, connected to a common connection (e.g., vehicle Wi-Fi), having a Bluetooth® connection together, etc. Based on the association between the C-UE and V-UE satisfying the threshold, the positioning information of the V-UE may be provided to the location management function (LMF) of the core network, which may use the V-UE's positioning information as the positioning information for the C-UE. This may enable the C-UE to remain in the idle state (e.g., rather than transition to the active state) during positioning operations, or may avoid the C-UE participating in positioning operations more generally.

A method for wireless communication at a base station is described. The method may include receiving positioning information for a first UE, the first UE supporting sidelink communications via a sidelink interface with one or more RSUs, identifying that a second UE is associated with the first UE, the association between the first UE and the second UE satisfying a threshold and the second UE supporting sidelink-assisted positioning, and providing, to a network entity, a message indicating the positioning information for the first UE and identifying the first UE and the second UE.

An apparatus for wireless communication at a base station is described. The apparatus may include a processor, memory coupled with the processor, and instructions stored in the memory. The instructions may be executable by the processor to cause the apparatus to receive positioning information for a first UE, the first UE supporting sidelink communications via a sidelink interface with one or more RSUs, identify that a second UE is associated with the first UE, the association between the first UE and the second UE satisfying a threshold and the second UE supporting sidelink-assisted positioning, and provide, to a network entity, a message indicating the positioning information for the first UE and identifying the first UE and the second UE.

Another apparatus for wireless communication at a base station is described. The apparatus may include means for receiving positioning information for a first UE, the first UE supporting sidelink communications via a sidelink interface with one or more RSUs, means for identifying that a second UE is associated with the first UE, the association between the first UE and the second UE satisfying a threshold and the second UE supporting sidelink-assisted positioning, and means for providing, to a network entity, a message indicating the positioning information for the first UE and identifying the first UE and the second UE.

A non-transitory computer-readable medium storing code for wireless communication at a base station is described. The code may include instructions executable by a processor to receive positioning information for a first UE, the first UE supporting sidelink communications via a sidelink interface with one or more RSUs, identify that a second UE is associated with the first UE, the association between the first UE and the second UE satisfying a threshold and the second UE supporting sidelink-assisted positioning, and provide, to a network entity, a message indicating the positioning information for the first UE and identifying the first UE and the second UE.

Some examples of the method, apparatuses, and non-transitory computer-readable medium described herein may further include operations, features, means, or instructions for providing, to the network entity, a signal indicating that the second UE supports the sidelink-assisted positioning.

Some examples of the method, apparatuses, and non-transitory computer-readable medium described herein may further include operations, features, means, or instructions for obtaining, from the network entity, a signal indicating a request for the positioning information for the second UE, where the message indicating the positioning information may be provided to the network entity based on the request.

Some examples of the method, apparatuses, and non-transitory computer-readable medium described herein may further include operations, features, means, or instructions for transmitting, to the second UE, an indication that the second UE may be to remain in an idle state during positioning operations based on the association between the first UE and the second UE satisfying the threshold.

Some examples of the method, apparatuses, and non-transitory computer-readable medium described herein may further include operations, features, means, or instructions for determining that the association between the first UE and the second UE fails to satisfy the threshold and selecting a third UE that may be associated with the second UE based on the association between the third UE and the second UE satisfying the threshold.

Some examples of the method, apparatuses, and non-transitory computer-readable medium described herein may further include operations, features, means, or instructions for receiving a signal from the second UE indicating that the association between the first UE and the second UE fails to satisfy the threshold, where the signal identifies the third UE.

Some examples of the method, apparatuses, and non-transitory computer-readable medium described herein may further include operations, features, means, or instructions for providing, to the network entity, a signal identifying the third UE and indicating that the third UE may be associated with the second UE.

Some examples of the method, apparatuses, and non-transitory computer-readable medium described herein may further include operations, features, means, or instructions for refraining from initiating a positioning procedure with the second UE based on the association with the first UE satisfying the threshold.

Some examples of the method, apparatuses, and non-transitory computer-readable medium described herein may further include operations, features, means, or instructions for receiving a signal indicating a positioning accuracy for the first UE, where the association satisfying the threshold may be based on the positioning accuracy of the first UE.

In some examples of the method, apparatuses, and non-transitory computer-readable medium described herein, the signal may be received from the second UE, the first UE, a RSU associated with the first UE, or a combination thereof.

In some examples of the method, apparatuses, and non-transitory computer-readable medium described herein, the threshold includes a proximity threshold, a positioning accuracy threshold, a travel threshold, a connection threshold, a shared connection threshold, or any combination thereof.

A method for wireless communication at a network entity is described. The method may include providing, to a base station, a signal indicating a request for positioning information for a first UE, obtaining a message indicating the positioning information for a second UE that supports sidelink communications via a sidelink interface with one or more RSUs and identifies the first UE and the second UE, where an association between the second UE and the first UE satisfies a threshold, and determining a position of the first UE based on the positioning information for the second UE and the association between the second UE and the first UE satisfying the threshold.

An apparatus for wireless communication at a network entity is described. The apparatus may include a processor, memory coupled with the processor, and instructions stored in the memory. The instructions may be executable by the processor to cause the apparatus to provide, to a base station, a signal indicating a request for positioning information for a first UE, obtain a message indicating the positioning information for a second UE that supports sidelink communications via a sidelink interface with one or more RSUs and identifies the first UE and the second UE, where an association between the second UE and the first UE satisfies a threshold, and determine a position of the first UE based on the positioning information for the second UE and the association between the second UE and the first UE satisfying the threshold.

Another apparatus for wireless communication at a network entity is described. The apparatus may include means for providing, to a base station, a signal indicating a request for positioning information for a first UE, means for obtaining a message indicating the positioning information for a second UE that supports sidelink communications via a sidelink interface with one or more RSUs and identifies the first UE and the second UE, where an association between the second UE and the first UE satisfies a threshold, and means for determining a position of the first UE based on the positioning information for the second UE and the association between the second UE and the first UE satisfying the threshold.

A non-transitory computer-readable medium storing code for wireless communication at a network entity is described. The code may include instructions executable by a processor to provide, to a base station, a signal indicating a request for positioning information for a first UE, obtain a message indicating the positioning information for a second UE that supports sidelink communications via a sidelink interface with one or more RSUs and identifies the first UE and the second UE, where an association between the second UE and the first UE satisfies a threshold, and determine a position of the first UE based on the positioning information for the second UE and the association between the second UE and the first UE satisfying the threshold.

Some examples of the method, apparatuses, and non-transitory computer-readable medium described herein may further include operations, features, means, or instructions for obtaining a signal indicating that the first UE supports the sidelink-assisted positioning.

Some examples of the method, apparatuses, and non-transitory computer-readable medium described herein may further include operations, features, means, or instructions for obtaining a signal indicating that the association between the second UE and the first UE fails to satisfy the threshold, where the signal identifies a third UE associated with the first UE and having an association that satisfies the threshold.

Some examples of the method, apparatuses, and non-transitory computer-readable medium described herein may further include operations, features, means, or instructions for determining a positioning accuracy associated with the second UE, where the association satisfying the threshold may be based on the positioning accuracy of the first UE.

In some examples of the method, apparatuses, and non-transitory computer-readable medium described herein, the threshold includes a proximity threshold, a positioning accuracy threshold, a travel threshold, a connection threshold, a shared connection threshold, or any combination thereof.

A method for wireless communication at a first UE is described. The method may include receiving, via a cellular interface, a signal indicating a request for positioning information for the first UE, receiving the positioning information of a second UE associated with the first UE, the second UE communicating with the first UE via a sidelink interface and the association between the first UE and the second UE satisfying a threshold, and transmitting, to a network entity via a base station, a message indicating the positioning information of the second UE for the first UE, the message identifying the second UE and the first UE.

An apparatus for wireless communication at a first UE is described. The apparatus may include a processor, memory coupled with the processor, and instructions stored in the memory. The instructions may be executable by the processor to cause the apparatus to receive, via a cellular interface, a signal indicating a request for positioning information for the first UE, receive the positioning information of a second UE associated with the first UE, the second UE communicating with the first UE via a sidelink interface and the association between the first UE and the second UE satisfying a threshold, and transmit, to a network entity via a base station, a message indicating the positioning information of the second UE for the first UE, the message identifying the second UE and the first UE.

Another apparatus for wireless communication at a first UE is described. The apparatus may include means for receiving, via a cellular interface, a signal indicating a request for positioning information for the first UE, means for receiving the positioning information of a second UE associated with the first UE, the second UE communicating with the first UE via a sidelink interface and the association between the first UE and the second UE satisfying a threshold, and means for transmitting, to a network entity via a base station, a message indicating the positioning information of the second UE for the first UE, the message identifying the second UE and the first UE.

A non-transitory computer-readable medium storing code for wireless communication at a first UE is described. The code may include instructions executable by a processor to receive, via a cellular interface, a signal indicating a request for positioning information for the first UE, receive the positioning information of a second UE associated with the first UE, the second UE communicating with the first UE via a sidelink interface and the association between the first UE and the second UE satisfying a threshold, and transmit, to a network entity via a base station, a message indicating the positioning information of the second UE for the first UE, the message identifying the second UE and the first UE.

Some examples of the method, apparatuses, and non-transitory computer-readable medium described herein may further include operations, features, means, or instructions for receiving, via a cellular interface, a second signal indicating a second request for a positioning accuracy, determining the positioning accuracy of the second UE based on the association satisfying the threshold, and transmitting an indication of the positioning accuracy of the second UE for the first UE responsive to the second request.

Some examples of the method, apparatuses, and non-transitory computer-readable medium described herein may further include operations, features, means, or instructions for receiving a second signal indicating a positioning accuracy of the second UE, where the association satisfying the threshold may be based on the positioning accuracy of the second UE.

In some examples of the method, apparatuses, and non-transitory computer-readable medium described herein, the signal may be received from the second UE, a RSU associated with the second UE, or a combination thereof.

In some examples of the method, apparatuses, and non-transitory computer-readable medium described herein, the threshold includes a proximity threshold, a positioning accuracy threshold, a travel threshold, a connection threshold, a shared connection threshold, or any combination thereof.

DETAILED DESCRIPTION

Some wireless communications systems typically use a variety of different cellular-based positioning procedures to track the location of a target user equipment (UE). These generally include information being exchanged between the target UE (e.g., the UE whose position is being determined) and the location management function (LMF) network entity via the base station serving the target UE. Such techniques may not leverage evolving wireless infrastructure, and its associated implications, during positioning operations, which may result in inefficient positioning operations.

Generally, the described techniques provide for a sidelink-assisted cellular positioning operations. That is, a vehicle user equipment (V-UE), which may communicate via sidelink, may be associated with a traditional, cellular UE (C-UE), such as the C-UE riding within a vehicle equipped with V-UE. Based on the association, the positioning information for the V-UE may be used during the cellular positioning operations of the C-UE. For example, a base station and/or the C-UE may receive or otherwise identify positioning information for the V-UE based on its association with the C-UE satisfying a threshold. For example, the threshold may be based on the two UE traveling together, connected to a common connection (e.g., vehicle Wi-Fi), having a Bluetooth® connection together, etc. Based on the association between the C-UE and V-UE satisfying the threshold, the positioning information of the V-UE may be provided to the location management function (LMF) of the core network, which may use the V-UE's positioning information as the positioning information for the C-UE. This may enable the C-UE to remain in the idle state (e.g., rather than transition to the active state) during positioning operations, or may avoid the C-UE participating in positioning operations more generally.

Aspects of the disclosure are initially described in the context of wireless communications systems. Aspects of the disclosure are further illustrated by and described with reference to apparatus diagrams, system diagrams, and flowcharts that relate to sidelink-assisted cellular-based positioning.

Figure 1:
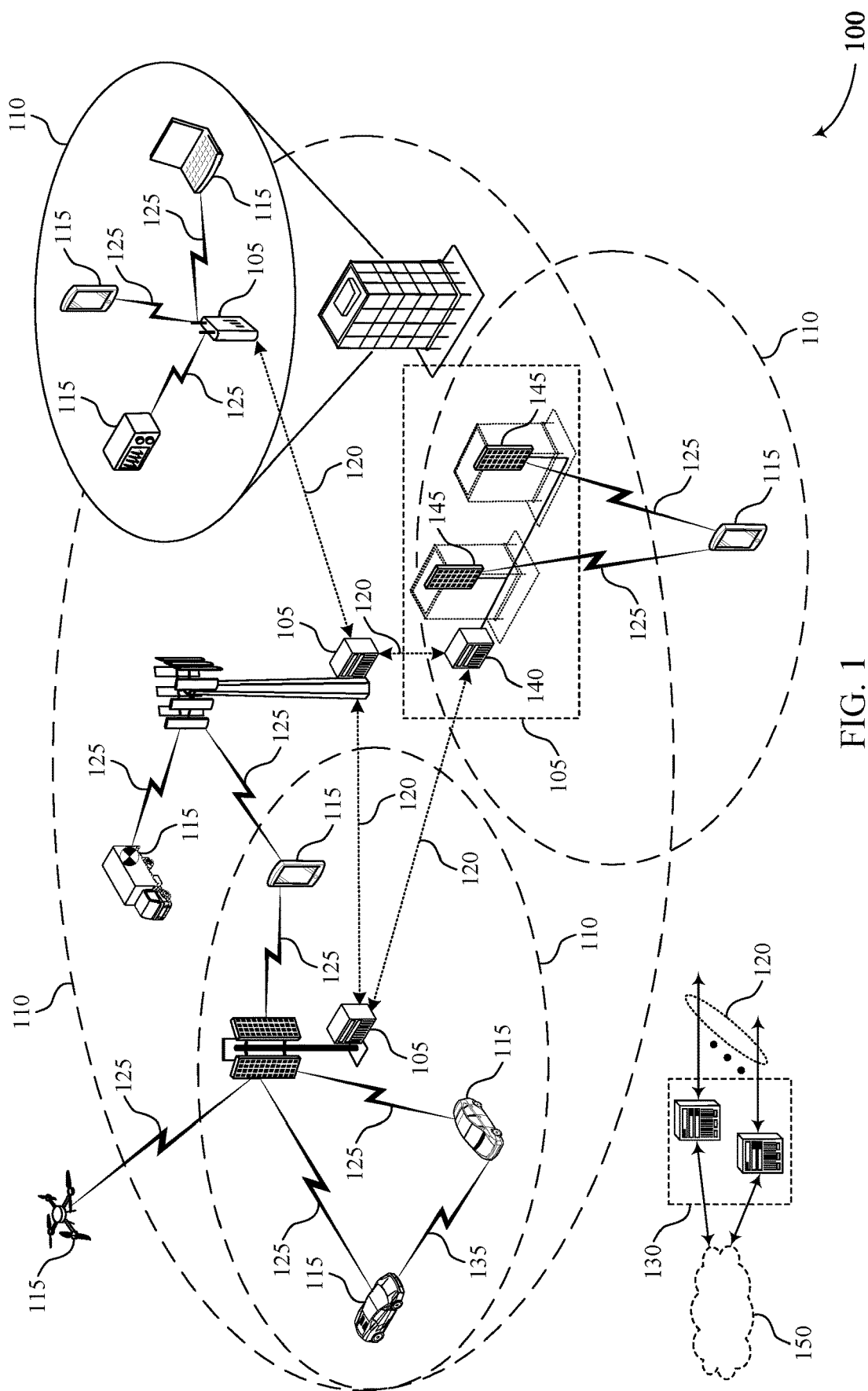
FIG. 1 illustrates an example of a wireless communications system that supports sidelink-assisted cellular-based positioning in accordance with aspects of the present disclosure.

FIG. 1 illustrates an example of a wireless communications system 100 that supports sidelink-assisted cellular-based positioning in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $TS=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A base station 105 may receive positioning information for a first UE (e.g., the V-UE in this example), the first UE supporting sidelink communications via a sidelink interface with one or more roadside units (RSUs). The base station 105 may identify that a second UE (e.g., the C-UE in this example) is associated with the first UE, the association between the first UE and the second UE satisfying a threshold and the second UE supporting sidelink-assisted positioning. The base station 105 may provide, to a network entity, a message indicating the positioning information for the first UE and identifying the first UE and the second UE.

A network entity (e.g., a LMF of core network 130) may provide, to a base station 105, a signal indicating a request for positioning information for a first UE (e.g., the C-UE in this example). The network entity may obtain a message indicating the positioning information for a second UE (e.g., the V-UE in this example) that supports sidelink communications via a sidelink interface with one or more RSUs and identifies the first UE and the second UE, wherein an association between the second UE and the first UE satisfies a threshold. The network entity may determine a position of the first UE based at least in part on the positioning information for the second UE and the association between the second UE and the first UE satisfying the threshold.

A UE 115 (e.g., a first UE, which may be the C-UE in this example) may receive, via a cellular interface, a signal indicating a request for positioning information for the first UE. The UE 115 may receive the positioning information of a second UE (e.g., the V-UE in this example) associated with the first UE, the second UE communicating with the first UE via a sidelink interface and the association between the first UE and the second UE satisfying a threshold. The UE 115 may transmit, to a network entity via a base station 105, a message indicating the positioning information of the second UE for the first UE, the message identifying the second UE and the first UE.

Figure 2:
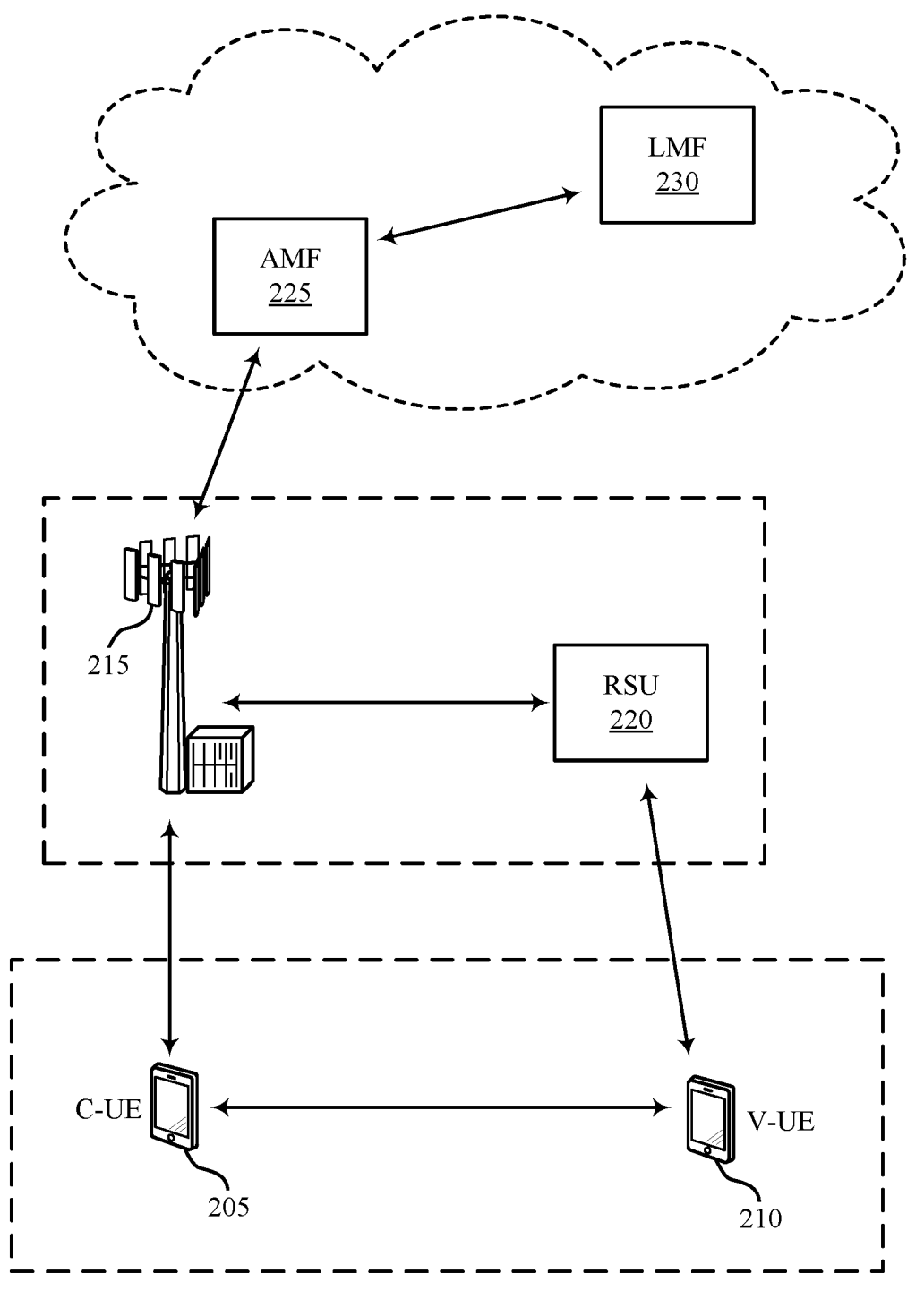
FIG. 2 illustrates an example of a wireless communication system that supports sidelink-assisted cellular-based positioning in accordance with aspects of the present disclosure.

FIG. 2 illustrates an example of a wireless communications system 200 that supports sidelink-assisted cellular-based positioning in accordance with aspects of the described techniques. Wireless communications system 200 may implement aspects of wireless communications system 100. Wireless communications system 200 may include UE 205 (e.g., the C-UE in this example), UE 210 (e.g., the V-UE in this example), base station 215, RSU 220, AMF 225, and LMF 230, which may be examples of the corresponding devices described herein. AMF 225 and/or LMF 230 may be examples of a network entity, which may be a component/function implemented within and/or implemented by a core network. RSU 220 may be an example of a UE and/or a device/function operating similar to a UE within wireless communications system 200.

In some aspects, RSU 220 may be deployed for V2X communications (e.g., RSU 220 communicates with a V-UE, such as UE 210). In some examples, RSU 220 may be co-located with base station 215 (e.g., physically within the same enclosure, located within a proximate range of base station 215, etc.). That is, a co-located deployment may include base station 215 (e.g., a micro cell) and RSU 220 being physically located together, such as being mounted together on traffic lights (in the same enclosure or in different enclosures on/near the traffic lights). It is to be understood that, in this context, base station 215 co-located with RSU 220 may be a gNB, or a CU/DU split architecture, and the like. RSU 220 may communicate with UE 205 and/or UE 210 via sidelink communications.

Co-location between base station 215 and RSU 220 provides opportunities for cross-radio access technology (RAT) enhancements. For example, RSU 220 may provide additional information that is usually not available via the cellular interface (e.g., the Uu interface), such as location, speed, route planning, etc., for UE 205 and/or UE 210. Such additional information may be used to improve cellular (e.g., Uu-based) operation, such as positioning operations for UE.

Wireless communication systems typically support cellular-based positioning operations to locate and track UE, such as UE 205 and/or UE 210. Various cellular-based positioning operations are defined.

One example cellular-based positioning operation may include a NR positioning protocol A (NRPPa) which supports NR Uu positioning. In this technique, a location service (LCS) correlation identifier and the AMF 225 identity has been passed to the LMF 230 by the serving AMF (which may include AMF 225 or a different AMF within the core network). First, the LMF 230 invokes the Namf_Communication_N1N2MessageTransfer service operation towards the AMF 225 to request the transfer of a Downlink (DL) Positioning message to the UE (e.g., the target UE whose position is being determined). The service operation includes the DL Positioning message. The Session ID parameter of the Namf_Communication_N1N2MessageTransfer service operation is set to the LCS Correlation identifier. The Downlink Positioning message may request location information from the UE, provide assistance data to the UE or query for the UE capabilities. Next, if the UE is in connection management (CM) IDLE state, the AMF 225 initiates a network triggered Service Request procedure to establish a signaling connection with the UE. Next, the AMF 225 forwards the Downlink Positioning message to the UE in a DL non-access stratum (NAS) TRANSPORT message. The AMF 225 includes a Routing identifier, in the DL NAS TRANSPORT message, which is set to the LCS Correlation identifier. The Downlink Positioning message may request the UE to response to the network, e.g., may request the UE to acknowledge the Downlink Positioning message, to return location information or to return capabilities. Next, the UE stores any assistance data provided in the Downlink Positioning message and performs any positioning measurements and/or location computation requested by the Downlink Positioning message.

Next, if the UE has entered the CM-IDLE state during the previous step and needs to respond to the request received previously, the UE instigates the UE triggered Service Request in order to establish a signaling connection with the AMF 225. Conditionally, the UE may next send to the AMF 228 the Uplink Positioning message included in a NAS TRANSPORT message, e.g., to acknowledge the Downlink Positioning message, to return any location information obtained previously or returns any capabilities, as requested. When the UE sends Uplink (UL) Positioning message in a NAS TRANSPORT message, the UE shall also include in the UL NAS TRANSPORT message the Routing identifier previously received. Also conditionally, the AMF 225 invokes the Namf_Communication_N1MessageNotify service operation towards the LMF 230 indicated by the routing identifier received previously. The service operation includes the Uplink Positioning message previously received and the LCS Correlation identifier. The final two steps may be repeated if the UE needs to send multiple Uplink Positioning messages to respond to the request. These steps may be repeated to send new assistance data, and to request further location information and further UE capabilities.

Another cellular-based positioning operation may include a UE-based/assisted positioning operation. In this example, a LCS Correlation identifier and the AMF 225 identity has been passed to the LMF 230 by the serving AMF. First, the LMF 230 invokes the Namf_Communication_N1N2MessageTransfer service operation towards the AMF 225 to request the transfer of a DL Positioning message to the UE (e.g., the target UE whose position is being determined). The service operation includes the DL Positioning message. The Session ID parameter of the Namf_Communication_N1N2MessageTransfer service operation is set to the LCS Correlation identifier. The Downlink Positioning message may request location information from the UE, provide assistance data to the UE or query for the UE capabilities. Next, if the UE is in CM IDLE state, the AMF 225 initiates a network triggered Service Request procedure to establish a signaling connection with the UE. Next, the AMF forwards the Downlink Positioning message to the UE in a DL NAS TRANSPORT message. The AMF 225 includes a Routing identifier, in the DL NAS TRANSPORT message, which is set to the LCS Correlation identifier. The Downlink Positioning message may request the UE to respond to the network, e.g., may request the UE to acknowledge the Downlink Positioning message, to return location information or to return capabilities. Next, the UE stores any assistance data provided in the Downlink Positioning message and performs any positioning measurements and/or location computation requested by the Downlink Positioning message. Next, if the UE has entered CM-IDLE state during the previous step and needs to respond to the request, the UE instigates the UE triggered Service Request in order to establish a signaling connection with the AMF 225.

Conditionally, the UE may next send to the AMF 225 the Uplink Positioning message included in a NAS TRANSPORT message, e.g., to acknowledge the Downlink Positioning message, to return any location information previously obtained or returns any capabilities, as requested. When the UE sends Uplink Positioning message in a NAS TRANSPORT message, the UE shall also include in the UL NAS TRANSPORT message the Routing identifier received in the previous step. Also conditionally, the AMF 225 invokes the Namf_Communication_N1MessageNotify service operation towards the LMF 230 indicated by the routing identifier previously received. The service operation includes the Uplink Positioning message received previously and the LCS Correlation identifier. The two previous steps may be repeated if the UE needs to send multiple Uplink Positioning messages to respond to the request previously received. All of these steps may be repeated to send new assistance data, and to request further location information and further UE capabilities.

In the NRPPa cellular-based positioning operation supporting NR Uu positioning, The NRPPa protocol provides the following functions. One function may include enhanced cell ID (E-CID) Location Information Transfer. This function allows the NG-RAN node to exchange location information with LMF 230 for the purpose of E-CID positioning and NR E-CID positioning. Another function may include inter-node time difference time-of arrival (OTDOA) Information Transfer. This function allows the NG-RAN node to exchange information with the LMF 235 for the purpose of OTDOA positioning. Another function may include reporting of General Error Situations. This function allows reporting of general error situations, for which function specific error messages have not been defined. Another function may include Assistance Information Transfer. This function allows the LMF 235 to exchange information with the NG-RAN node for the purpose of assistance information broadcasting. Another function may include Positioning Information Transfer. This function allows the NG-RAN node to exchange positioning information with the LMF 235 for the purpose of positioning.

Another function may include Measurement Information Transfer. This function allows the LMF 235 to exchange measurement information with the NG-RAN node for the purpose of positioning. Another function may include TRP Information Transfer. This function allows an LMF 235 to obtain TRP related information from an NG-RAN node. One example of a location information transfer procedure supported by NRPPa may include positioning information exchange initiated by the LMF 235 to request to the NG-RAN node positioning information for the UE.

Accordingly, a number of positioning methods have been specified to determine the target UE location. These include, but are not limited to, OTDOA positioning, assisted global navigation satellite system (A-GNSS) positioning, Enhanced Cell ID positioning, Terrestrial Beacon System positioning, Sensor based positioning, WLAN-based positioning, Bluetooth-based positioning, NR UL positioning, NR E-CID positioning, NR DL-time difference of arrival (TDOA) positioning, NR DL-angle-of-departure (AoD) positioning, NR Multi-round trip time (RTT) positioning, and the like. Information Elements (IEs) that are exchanged between the target UE and LMF 235 for positioning have also been specified. For example, in A-GNSS positioning, the IE A-GNSS-ProvideAssistanceData is used by the location server to provide assistance data to enable UE-based and UE-assisted A-GNSS; the IE A-GNSS-ProvideLocationInformation is used by the target device to provide location measurements (e.g., pseudo-ranges, location estimate, velocity) to the location server, together with time information; and the like.

Accordingly, aspects of the described techniques enable sidelink-assisted cellular-based positioning operations. In some aspects the V-UE (e.g., UE 210) is capable of V2X communication (e.g., via sidelink). Another UE (e.g., the C-UE, such as UE 205, may be a driver's or passenger's mobile phone which is in the vehicle) is capable of cellular (e.g., Uu interface) communication. In some aspects, the C-UE (e.g., UE 205) may or may not be sidelink capable (e.g., UE 205 may be able to communicate with V-UE via sidelink). RSU 220 may be co-located with base station 215 and may be capable of communicating with the V-UE (e.g., via sidelink). In some aspects, RSU 220 may provide the V-UE's information (location, path/route, etc.) received via sidelink to the base station 215. The described techniques enable network protocol and positioning architecture enhancements to support PC5 assisted Uu positioning (e.g., sidelink-assisted cellular-based positioning). In this context, C-UE (e.g., UE 205) is the target device to be positioned. In some aspects, the V-UE's (e.g., UE 210) location is known at base station 215 (e.g., based on the RSU-BS co-location). The C-UE's location can be determined/derived based on V-UE's location if the two UEs are associated with each other.

As discussed, current 5G NR network protocol (and positioning architecture) do not support such sidelink-assisted positioning operations. Techniques described herein provide various solutions to enable such PC5 assisted Uu positioning. Broadly, for the NG-RAN node (e.g., base station 215), receiving the V-UE's location (maybe also V-UE's other information, such as identifier) from RSU 220 may be included. The interface between base station 215 and RSU 220 may be standardized in the relevant standards and/or may be open-RAN. Determining that the target device (the UE that is to be positioned) is associated with the V-UE may be performed. The association between the target UE and the C-UE can be based on 3GPP-based approach (e.g., by enhanced PC5 discovery), or based on a non-3GPP-based approach (e.g., Bluetooth, pairing the UEs manually, etc.). This may include sending the V-UE's location to AMF 225 or LMF 230. This can be in response to positioning information request from the location server (e.g., LMF 235).

Various benefits may be realized by such techniques. For example, if the target device's location can be determined based on the target device being associated with a V-UE that has a known location, the location information can be directly sent to the location server (e.g., LMF 235) without triggering RAN related positioning operations, such as PRS and/or SRS transmissions and measurements. Therefore, Uu signaling overhead for positioning can be reduced and the target device's power can be saved as well. The V-UE's location is expected to be very accurate (which may be based on more accurate GNSS positioning). As a result, the PC5 assisted Uu positioning is expected to meet or exceed quality of service (QoS) requirements for positioning (may even be much better than the required positioning QoS).

The new positioning method described herein may support PC5 assisted Uu positioning (e.g., sidelink-assisted cellular-based positioning). Broadly, the described techniques provide for leveraging an association between UE 210 (e.g., the V-UE) and UE 205 (e.g., the C-UE) to enable UE 210 positioning information to be applicable to or otherwise used as the positioning information for UE 205. In one example, base station 215 may receive or otherwise obtain positioning information for a first UE (e.g., UE 210, which is the V-UE in this example). The positioning information may be received directly from the V-UE (e.g., via a Uu/cellular interface when UE 210 supports cellular communications), from RSU 220 (e.g., via a wired and/or wireless link between base station 215 and RSU 220), and/or from the C-UE (e.g., from UE 205 via a cellular interface, which is a second UE in this example). For example, UE 210 (e.g., the first UE in this example) may be performing sidelink communications (e.g., via a PC5 interface) with RSU 220 and/or UE 205 (e.g., also via the PC5 interface, when UE 205 supports sidelink communications) and transmit or otherwise provide its positioning information via the PC5/sidelink interface, which may be provided to base station 215.

In some aspects of this example, base station 215 may receive or otherwise obtain the positioning information of UE 210 in response to a request for positioning information received from a network entity. For example, AMF 225 and/or LMF 230 (which may be examples of a network entity within a core network) may transmit or otherwise provide (e.g., via a backhaul link from the core network) a signal requesting the positioning information for UE 205 (which would be considered the first UE from the perspective of the network entity). In response to the signal requesting the positioning information of UE 205, base station 215 may receive or otherwise obtain the positioning information of/for UE 210.

In some aspects, the positioning information of UE 210 may be received or otherwise obtained for UE 205 based at least in part on an association between UE 210 and UE 205 satisfying a threshold. That is, the positioning information of UE 210 may be leveraged as the positioning information of UE 205, at least to some degree, based on the nature of the association between UE 205 and UE 210. In one example, the association may be based on UE 210 being a V-UE and UE 210 being a C-UE (e.g., a traditional UE) inside the vehicle associated with the V-UE. For example, the threshold for the association may be based on UE 205 establishing a connection (e.g., a connection threshold and/or shared connection) with the vehicle and/or V-UE (e.g., UE 205 establishing a Wi-Fi and/or Bluetooth® connection to/within the vehicle). Based on the connection threshold being satisfied, this may provide an indication that UE 205 is located/traveling along with UE 210 and, therefore, the positioning information of UE 210 is applicable to UE 205.

In another example, the threshold for the association may be based on UE 205 and UE 210 traveling along the same path/direction/speed. That is, the threshold may correspond to a travel threshold. Positioning information (e.g., previously tracked positioning information) for UE 205 and UE 210 may indicate that each UE is traveling together in substantially the same path/direction/speed. For example, each UE may be traveling in the same vehicle, bus, train, etc. Based on each UE traveling together along the same path/direction/speed, this may indicate that the positioning information of UE 210 may be leveraged as the positioning information for UE 205. The travel threshold being satisfied may be based on each UE traveling along substantially the same path/direction/speed.

In another example, the threshold for the association may be based on UE 205 and UE 210 being proximate to each other (e.g., a proximity threshold). For example, previously identified positioning information of UE 205 and UE 210 may indicate that each UE is located within a proximate range of each other. Based on each UE being proximate to each other, this may indicate that the positioning information of UE 210 may be applicable as positioning information of UE 205.

In another example, the threshold for the association may be based on a positioning accuracy threshold. That is, the association may be based on the positioning accuracy of UE 210 satisfying the positioning accuracy threshold. In some examples, UE 210 may be a V-UE and/or otherwise equipped with a highly accurate positioning determination method (e.g., GNSS, GPS, etc.). In this context, the positioning accuracy of UE 210 may be leveraged as the positioning information of UE 205. In some aspects, UE 210 may transmit or otherwise provide a signal indicating the positioning accuracy of UE 210 (e.g., in a UE capability message, UE assistance information message, and the like). For example, the signal may indicate the method of positioning being used by UE 210 (e.g., GNSS, GPS, etc.), which may provide an indication of the accuracy of positioning techniques supported by UE 210. The signal may be received directly from UE 210 and/or indirectly via UE 205 and/or RSU 220.

In another example, the association may be based on any combination of the proximity threshold, the positioning accuracy threshold, the travel threshold, the connection threshold, and/or the shared connection threshold.

Accordingly and based on the association between UE 205 and UE 210 satisfying a threshold, base station 215 may transmit or otherwise provide a message indicating the positioning information for UE 210 (e.g., which is the V-UE in this example and may be referred to as the first UE from the perspective of base station 215) to the network entity (e.g., AMF 225 and/or LMF 230). Based on the association satisfying the threshold and the message indicating the positioning information of UE 210 (which is the V-UE in this example and may be referred to as the second UE from the perspective of the network entity), the network entity may identify or otherwise determine the position of UE 205 (e.g., the C-UE in this example and may be referred to as the first UE from the perspective of the network entity). The position of UE 205 may be determined based on the positioning information of UE 210 and the association between each UE satisfying the threshold. For example, the network entity (e.g., AMF 225 and/or LMF 230) may use the positioning information of UE 210 as the position of UE 205 based on the association.

In some aspects, the message may identify UE 205 and UE 210. For example, the message may carry or otherwise convey information identifying each of UE 205 and UE 210. The identifying information may include an identifier associated with each UE, such as a RNTI or other network-associated identifier. In another example, the identifier associated with each UE may be a non-network identifier (e.g., a serial number or other number uniquely identifying each UE.

In some aspects, this technique may be based on the capability of UE 205. For example, UE 205 may transmit or otherwise provide a signal indicating that UE 205 supports the sidelink-assisted cellular-based positioning operations. The signal may be indicated in a UE capability message, a UE assistance information message, and the like. The message may include one or more bits, information elements, fields, etc., indicating that UE 205 (e.g., the target device whose position is to be determined) supports such PC5 assisted Uu positioning techniques.

In some aspects, the association between UE 205 and UE 210 may change (e.g., based on a change in path/direction/speed), which may necessitate an updated to the sidelink-assisted cellular-based positioning operations. For example, the change may result in the association between UE 205 and UE 210 no longer satisfying the threshold. UE 205 and/or UE 210 may transmit or otherwise provide the indication to base station 215 that the association between UE 205 and UE 210 no longer satisfies the threshold. Based on the change, base station 215 may identify or otherwise determine that the association between UE 205 and UE 210 no longer satisfies the threshold. Based on the failure to satisfy the threshold, a new UE (e.g., a third UE) may be identified or otherwise selected based on its association with UE 205 satisfying the threshold. Accordingly, base station 215 may transmit or otherwise provide to the network entity a signal identifying the new UE (e.g., the third UE in this example) that has an association with UE 205 that satisfies the threshold. The signal may also identify the third UE.

In some aspects, the described techniques may conserve resources/power of UE 205 using the sidelink-assisted cellular-based positioning operations. For example, UE 205 may be able to skip RRC active/inactive states (e.g., remain in an RRC idle state) based on leveraging the positioning information of UE 210 as the positioning information for UE 205. For example, base station 215 may transmit or otherwise provide an indication to UE 205 to remain in an idle state during positioning operations based on the association satisfying the threshold. The indication may be transmitted or otherwise provided in an RRC signal, MAC CE signal, and the like. For example, the indication may be transmitted as part of configuring UE 205 with the DRX mode operations, configuring UE 205 with positioning operations, and the like.

Another benefit to the described techniques may include UE 205 skipping positioning operations all together based on its association with UE 210 satisfying the threshold. For example, base station 215 may transmit or otherwise provide an indication to UE 205 to refrain from initiating a positioning procedure based on the association satisfying the threshold.

Accordingly, in this example of the described techniques a new positioning method is provided that leverages an association between UE 205 and a sidelink UE (e.g., UE 210) that satisfies a threshold during positioning operations of UE 205. The new positioning method may be specified to support the PC5 assisted Uu positioning. UE 205 (e.g., the target device whose position is to be determined) and/or base station 215 (e.g., the NG-RAN) may report to location server (e.g., the network entity, such as AMF 225 and/or LMF 230) the capability of PC5 assisted positioning (i.e., the target device can be positioned based on the location of an associated UE (e.g., the V-UE, which is UE 210 in this example). The associated UE's PC5 ID(s) (e.g., the identifier information associated with the sidelink UE) may be included in the report. AMF 225 may request the location of the associated UE from the NG-RAN (e.g., base station 215) for positioning of the target device (e.g., UE 205). If AMF 225 knows that the PC5 assisted mechanism can be used, it may not need to trigger paging (i.e., a "network triggered Service Request procedure" with UE 205). Instead, AMF 225 may try to query some PC5 based location service function, with the provided PC5 IDs, to obtain the location information. AMF 228 can determine which base station/cell to query, based on the last cell the target device is associated with, or the tracking area identity (TAI) list it allocated to the target device. The NG-RAN (e.g., base station 215) provides the associated UE's location (e.g., the positioning information of UE 210) to the location server upon request for the target device's location.

The target device (e.g., UE 205) may go back to an RRC idle state immediately after reporting the PC5 assisted positioning capability. The target device's location can be determined/tracked based on the PC5 ID by the location server without waking up the UE 205. The target device may need to report the PC5 ID whenever it is changed (e.g., the associated V-UE's PC5 ID may be updated periodically). This may be useful for a delayed Location Service and/or for periodical location service request(s). For the base station 215 (NG-RAN), the lower layer measurements for positioning can be avoided (e.g., transmissions/measurements of reference signals for positioning). This example may be operated as either a network assisted/based positioning and/or a UE assisted/based positioning mechanism.

Accordingly, a second example of the sidelink-assisted cellular-based positioning is described that is a UE assisted/based positioning mechanism. In this approach, UE 205 and/or UE 210 may also report their respective capability to support the sidelink-assisted cellular-based positioning. Also, the association between UE 205 and UE 210 may also satisfy the threshold, as discussed above. Further, updates to the association may also be signaled (e.g., to change to a third UE that is also associated with UE 205).

In this example, UE 205 (e.g., the target device whose position is to be determined, which may also be referred to as the first UE in this example) may determine that its position is to be determined. For example, UE 205 may receive (e.g., via a cellular/Uu interface with base station 215) a signal indicating a request for positioning information for the first UE (e.g., UE 205). In another example, the determination that its position is to be determined may be autonomously determined by UE 205 (e.g., based on a detected change in its position). In this situation, UE 205 may receive or otherwise obtain the positioning information of UE 210 (e.g., the V-UE, which may be referred to as a second UE in this example). UE 205 may identify or otherwise determine the positioning information of UE 210 based on the association between UE 205 and UE 210 satisfying the threshold, as discussed above. In this example, UE 205 may transmit or otherwise provide (e.g., to the network entity via base station 215) a message indicating the positioning information of UE 210 for UE 205 (e.g., indicating the positioning information of UE 210 as the positioning information of UE 205). Similar to the techniques discussed above, the message may also carry or otherwise convey identifying information for UE 205 and UE 210.

In some aspects of this UE assisted positioning techniques, UE 205 may report the positioning information of UE 210 as its own positioning information based on the positioning accuracy of UE 210 and the association satisfying the threshold. For example, base station 215 may transmit or otherwise provide a second signal to UE 205 indicating a request for the positioning accuracy of UE 210. Based on UE 205 determining the positioning accuracy of UE 210 (e.g., via a sidelink and/or cellular interface between UE 205 and UE 210) and then transmit or otherwise provide an indication of the positioning accuracy of UE 210 in response. In other examples, UE 205 may be informed of the positioning accuracy of UE 210 based on receiving a signal from base station 215 and/or RSU 220.

Accordingly, in this UE assisted approach UE 205 may identify, receive, or otherwise determine the positioning information of UE 210 and then report it as its own positioning information to the network entity (e.g., AMF 225 and/or LMF 230) via base station 215. The target device (e.g., UE 205) may be capable of V2X (sidelink) communications. For example, the target device may be able to receive V2X messages from a V2X UE (e.g., the target device communicates over sidelink as a pedestrian UE). Upon receiving of request for location information (e.g., receiving a downlink positioning message), the target device may provide the associated UE's location (e.g., acquired via sidelink communication) to location server (e.g., to AMF 225 in an uplink positioning message). The target device's power consumption may be reduced following such techniques (e.g., by providing its location without turning on a GNSS receiver). Additionally, the target device may report the associated UE's GNSS capability (e.g., positioning accuracy of UE 210). The location server (e.g., AMF 225 and/or LMF 230) may request GNSS location capabilities from the target device (e.g., the positioning accuracy of UE 210). If the target device determines its location based on the location of the associated UE, the target device may also report the associated UE's GNSS location capabilities (e.g., positioning accuracy) to the location server (this may be transparent to the location server, i.e., as if the positioning accuracy/information is/are the target device's capabilities). The target device may obtain the associated UE's GNSS location capabilities via sidelink communications. Examples of GNSS location capabilities include, but are not limited to, a list of GNSS supported, velocity types, support of periodical reporting, etc.

In another example of the techniques discussed herein, opportunistically positioning may be supported based on the association between UE 205 and UE 210 satisfying the threshold. That is, the associated UE's location (e.g., positioning information of UE 210) may be provided to the location server (e.g., AMF 225 and/or LMF 230) opportunistically for positioning the target device (e.g., UE 205). The location server may send a network positioning message to base station 215 to request location or positioning measurements related to the target device. Upon determining the association between the target device and another UE that has known location, base station 215 may return the associated UE's location to the location server, as the location of the target device. Base station 215 may proceed with regular/legacy positioning operations if base station 215 determines that the PC5 assisted positioning is not feasible (e.g., there is no UE with a known location associated with the target device).

In some aspects, triggering the PC5 assisted positioning may be based on quality of service (QoS) requirements. For example, the V-UE may also indicate its location accuracy in a V2X message transmission. In one example, the positioning accuracy can be part of UE capability. UEs having larger capability in positioning (e.g., having more advanced GNSS receiver, or it can perform positioning based on other assistance information, etc.) may achieve better positioning accuracy. In another example, V-UE's location carried in a V2X message may be scrambled due to privacy concerns, i.e., the location is sent in a V2X message is not its actual location. The V-UE may indicate whether location scrambling has been applied (or QoS that can be expected from the scrambled location). RSU 220 may provide the location accuracy to base station 215 when providing the V-UE's location information (e.g., positioning information). Base station 215 may determine whether the location accuracy can meet the requested positioning QoS for the target device (e.g., whether the positioning accuracy satisfies the threshold). Base station 215 may perform the PC5 assisted Uu positioning if the location accuracy can meet the required positioning QoS.

Figure 3:
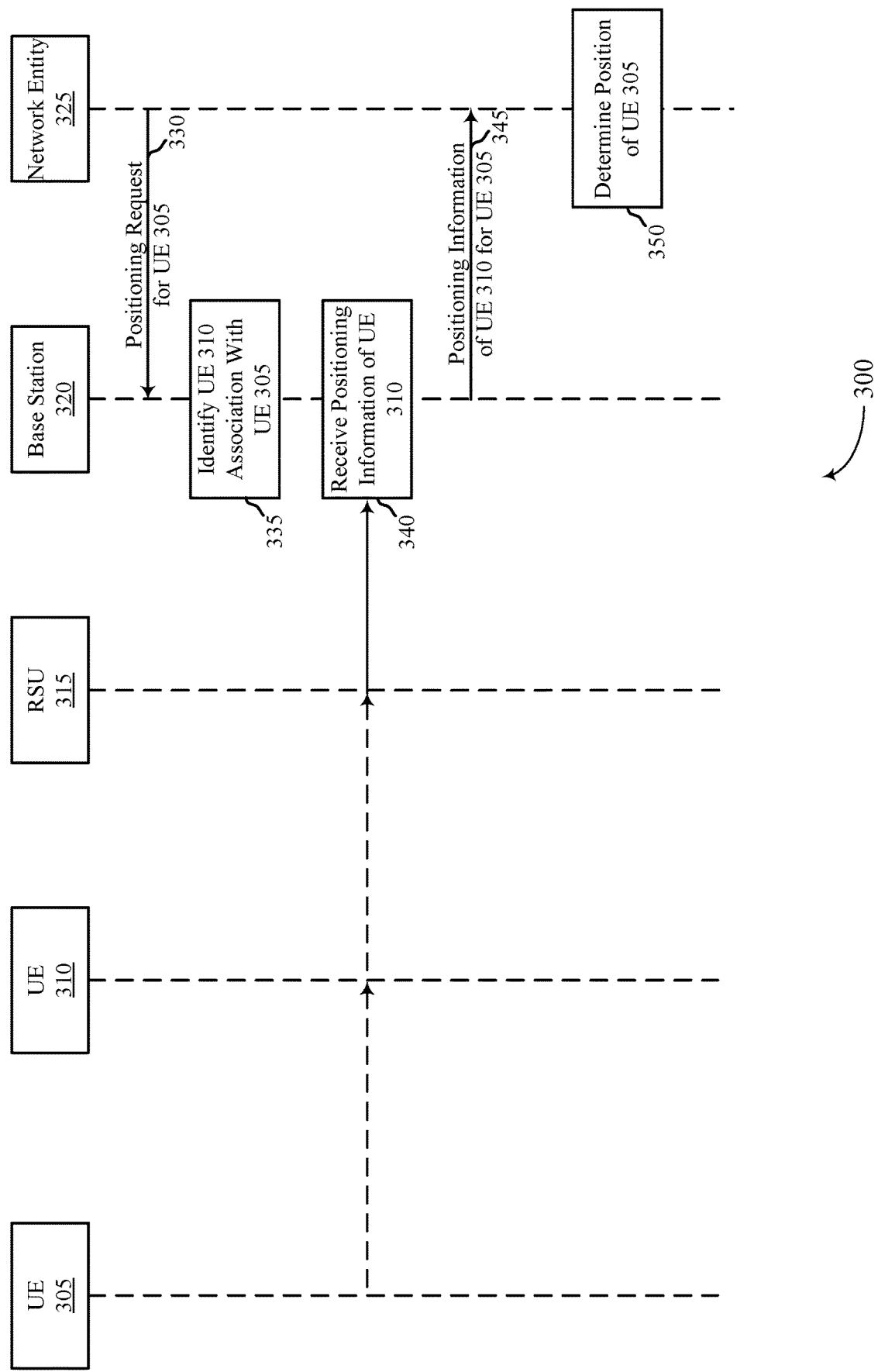
FIG. 3 illustrates an example of a process that supports sidelink-assisted cellular-based positioning in accordance with aspects of the present disclosure.

FIG. 3 illustrates an example of a process 300 that supports sidelink-assisted cellular-based positioning in accordance with aspects of the present disclosure. Process 300 may implement aspects of and/or may implement aspects of wireless communications systems 100 and/or 200. Process 300 may be implemented by or implemented at UE 305, UE 310, RSU 315, base station 320, and/or network entity 325, which may be examples of the corresponding devices described herein. UE 305 may be considered the target device (e.g., a C-UE) whose position is to be determined. UE 310 may be associated with UE 305 and may be a V-UE performing sidelink communications. RSU 315 may be an example of a UE communicating with UE 310 via a sidelink interface. Network entity 325 may be an example of an AMF and/or LMF within a core network.

At 330, a network entity 325 may transmit or otherwise provide (and base station 320 may receive or otherwise obtain) a signal indicating request for positioning information for a first UE (e.g., UE 305 in this example). Although the signal requesting the positioning may be for the first UE (e.g., UE 305), the signal may actually request positioning information for a second UE (e.g., UE 310 in this example) based on an association between UE 305 and UE 310 satisfying a threshold. The signal may be transmitted/provided via a backhaul link between base station 320 and network entity 325.

At 335, base station 320 may identify or otherwise determine that a second UE (e.g., UE 310 in this example) is associated with UE 305. For example, base station 320 may identify or otherwise determine that the association between UE 305 and UE 310 satisfies a threshold. Base station 320 may identify or otherwise determine that UE 310 supports sidelink-assisted positioning. The threshold in this context may correspond to a proximity threshold, a positioning accuracy threshold, a travel threshold, a connection threshold, and/or a shared connection threshold between UE 305 and UE 310. In some aspects, base station 320 may receive a signal from UE 305, UE 310, and/or RSU 315 identifying or otherwise indicating the association between UE 305 and UE 310.

Accordingly and at 340, base station 320 may receive, identify or otherwise determine positioning information of UE 310 based on the association between UE 305 and UE 310 satisfying the threshold. For example, the positioning information if UE 310 may be provided to base station 320 based on a positioning accuracy of UE 310 satisfying the threshold.

At 345, base station 320 may transmit or otherwise provide (a network entity 325 may receive or otherwise obtain) a message indicating the positioning information of UE 310 as the positioning information for UE 305. In some aspects, the message may carry or otherwise convey identifying information for UE 305 and UE 310. For example, the message may carry or otherwise convey an identifier of UE 305, an identifier of UE 310, an indication of the positioning accuracy of UE 310, and the like.

Accordingly and at 350, a network entity 325 may identify or otherwise determine the position of UE 305 based on the positioning information of UE 310 and the association between UE 305 and UE 310 satisfying the threshold. That is, a network entity 325 may identify or otherwise determine the location of UE 305 based on its association with UE 310.

Figure 4:
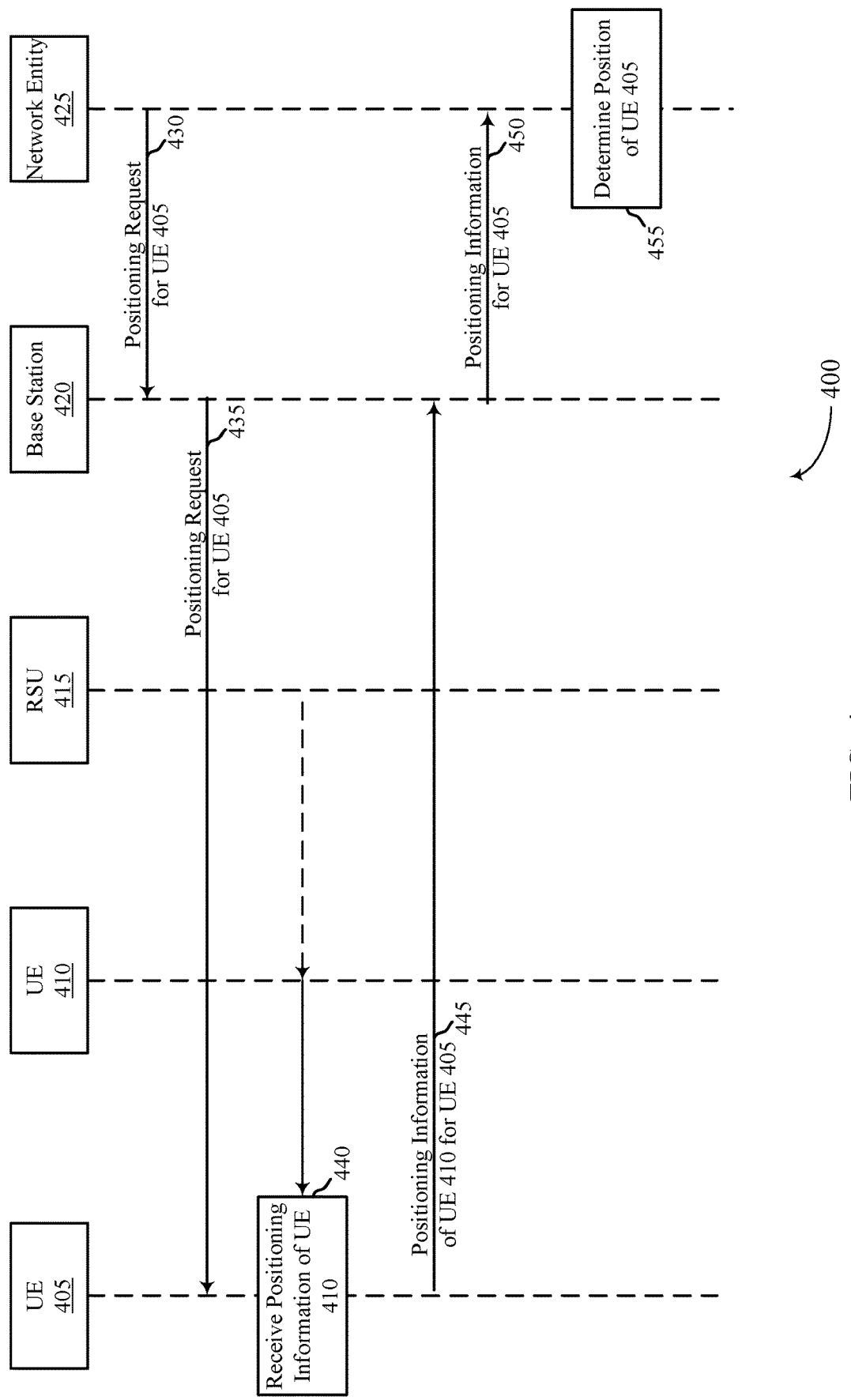
FIG. 4 illustrates an example of a process that supports sidelink-assisted cellular-based positioning in accordance with aspects of the present disclosure.

FIG. 4 illustrates an example of a process 400 that supports sidelink-assisted cellular-based positioning in accordance with aspects of the present disclosure. Process 400 may implement aspects of and/or may implement aspects of wireless communications systems 100 and/or 200. Process 400 may be implemented by or implemented at UE 405, UE 410, RSU 415, base station 420, and/or network entity 425, which may be examples of the corresponding devices described herein. UE 405 may be considered the target device (e.g., a C-UE) whose position is to be determined. UE 410 may be associated with UE 405 and may be a V-UE performing sidelink communications. RSU 415 may be an example of a UE communicating with UE 410 via a sidelink interface. Network entity 425 may be an example of an AMF and/or LMF within a core network.

At 430, a network entity 425 may transmit or otherwise provide (and base station 420 may receive or otherwise obtain) a signal indicating request for positioning information for a first UE (e.g., UE 405 in this example). Although the signal requesting the positioning may be for the first UE (e.g., UE 405), the signal may actually request positioning information for a second UE (e.g., UE 410 in this example) based on an association between UE 405 and UE 410 satisfying a threshold. The signal may be transmitted/provided via a backhaul link between base station 420 and network entity 425.

At 435, base station 420 may transmit or otherwise provide (and UE 405 may receive or otherwise obtain) a signal indicating the request for positioning information for UE 405. The signal may be communicated be a cellular interface (e.g., the Uu interface).

At 440, UE 405 may receive or otherwise determine positioning information of UE 410 (e.g., a second UE in this example) associated with UE 405. Again, UE 410 may be a sidelink UE communicating with UE 405 and/or RSU 415 via sidelink interface. The association between UE 405 and UE 410 may satisfy a threshold, such as a proximity threshold, positioning accuracy threshold, a travel threshold, a connection threshold, and/or a shared connection threshold. UE 405 may receive the positioning information of UE 410 directly from UE 410 and/or from RSU 415.

At 445, UE 405 may transmit or otherwise provide (and base station 420 may receive or otherwise obtain) a message indicating the positioning information of UE 410 for UE 405. That is, the message may carry or otherwise convey the positioning information of UE 410 as the positioning information of UE 405 (e.g., transparently) or may indicate that the positioning information is for UE 410, which may be applied as positioning information for UE 405 based on the association. Again, the message may carry or otherwise convey information identifying UE 405 and UE 410.

At 450, base station 420 may transmit or otherwise provide (and network entity 425 may receive or otherwise obtain) the positioning information of UE 405. For example, base station 420 may transmit or otherwise provide the positioning information via a backhaul link between base station 420 and network entity 425.

Accordingly and at 455, a network entity 425 may identify or otherwise determine the position of UE 405 based on the positioning information of UE 410 and the association between UE 405 and UE 410 satisfying the threshold. That is, a network entity 425 may identify or otherwise determine the location of UE 405 based on its association with UE 410.

Figure 5:
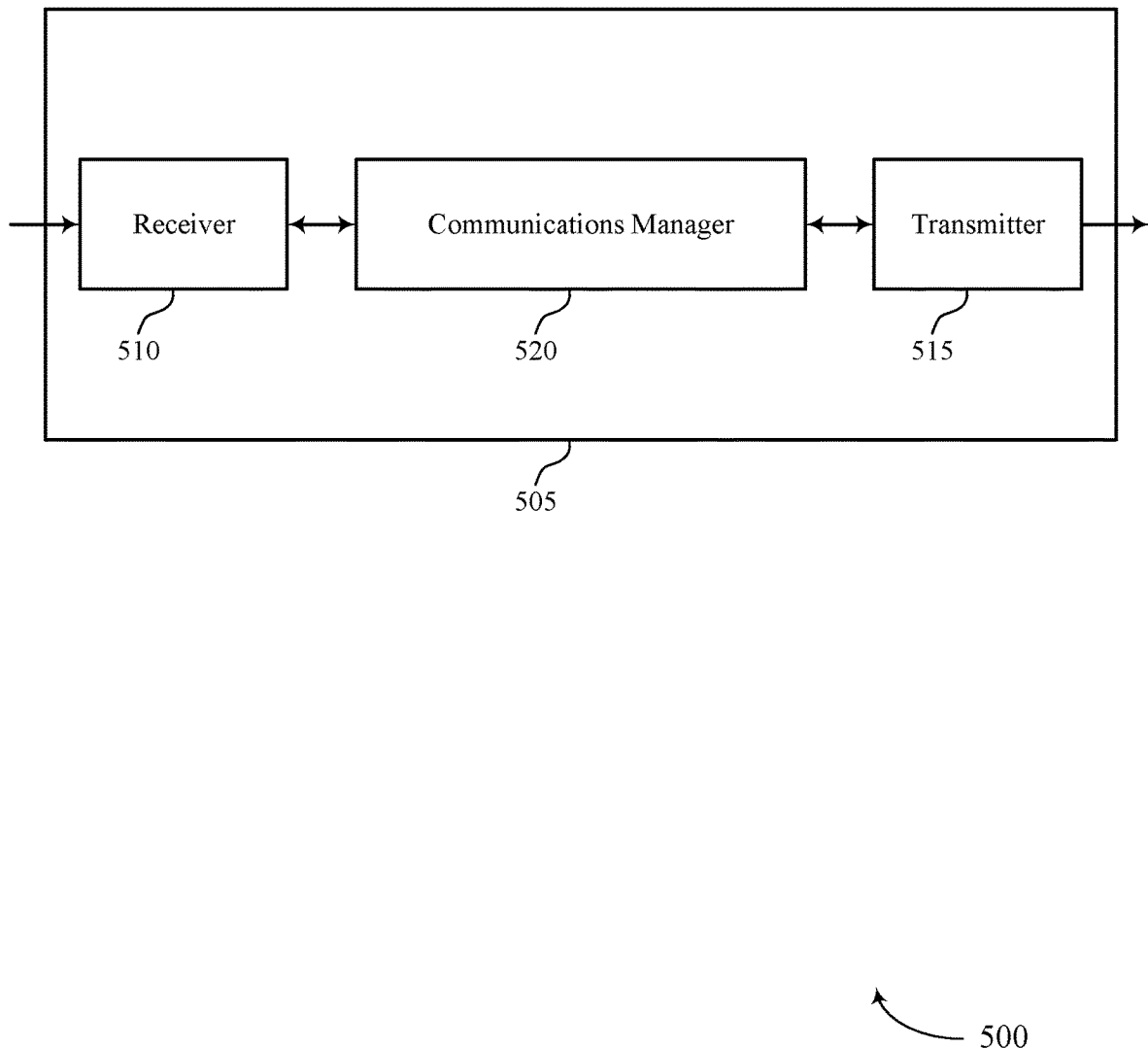
FIGS. 5 and 6 show block diagrams of devices that support sidelink-assisted cellular-based positioning in accordance with aspects of the present disclosure.

FIG. 5 shows a block diagram 500 of a device 505 that supports sidelink-assisted cellular-based positioning in accordance with aspects of the present disclosure. The device 505 may be an example of aspects of a base station 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to sidelink-assisted cellular-based positioning). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to sidelink-assisted cellular-based positioning). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of sidelink-assisted cellular-based positioning as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a base station in accordance with examples as disclosed herein. For example, the communications manager 520 may be configured as or otherwise support a means for receiving positioning information for a first UE, the first UE supporting sidelink communications via a sidelink interface with one or more roadside units. The communications manager 520 may be configured as or otherwise support a means for identifying that a second UE is associated with the first UE, the association between the first UE and the second UE satisfying a threshold and the second UE supporting sidelink-assisted positioning. The communications manager 520 may be configured as or otherwise support a means for providing, to a network entity, a message indicating the positioning information for the first UE and identifying the first UE and the second UE.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for more efficient cellular-based positioning operations that are assisted by a sidelink UE by leveraging an association between the target UE and the sidelink UE to support the positioning information of the sidelink UE for the target UE.

Figure 6:
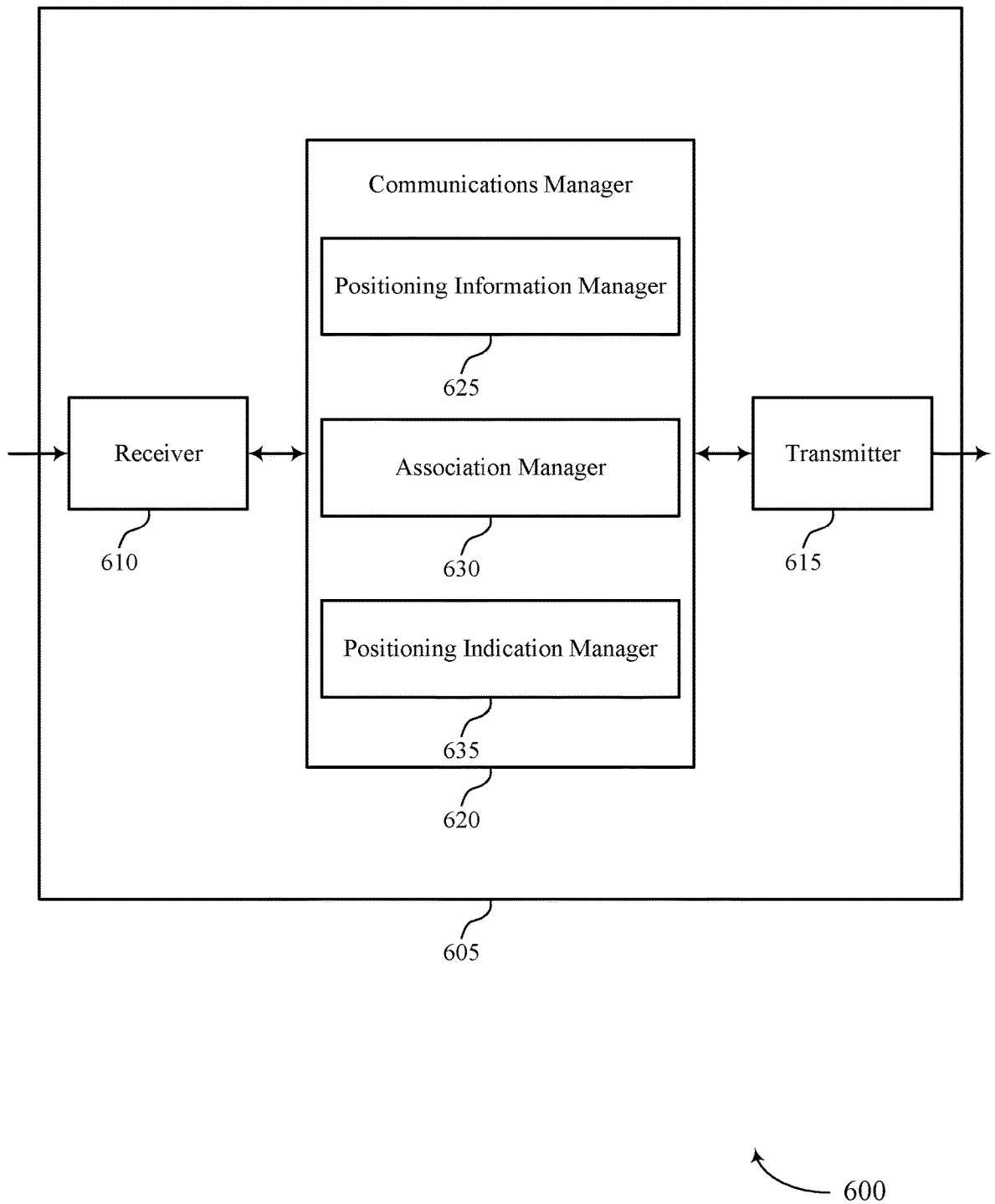

FIG. 6 shows a block diagram 600 of a device 605 that supports sidelink-assisted cellular-based positioning in accordance with aspects of the present disclosure. The device 605 may be an example of aspects of a device 505 or a base station 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to sidelink-assisted cellular-based positioning). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to sidelink-assisted cellular-based positioning). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of sidelink-assisted cellular-based positioning as described herein. For example, the communications manager 620 may include a positioning information manager 625, an association manager 630, a positioning indication manager 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a base station in accordance with examples as disclosed herein. The positioning information manager 625 may be configured as or otherwise support a means for receiving positioning information for a first UE, the first UE supporting sidelink communications via a sidelink interface with one or more roadside units. The association manager 630 may be configured as or otherwise support a means for identifying that a second UE is associated with the first UE, the association between the first UE and the second UE satisfying a threshold and the second UE supporting sidelink-assisted positioning. The positioning indication manager 635 may be configured as or otherwise support a means for providing, to a network entity, a message indicating the positioning information for the first UE and identifying the first UE and the second UE.

Figure 7:
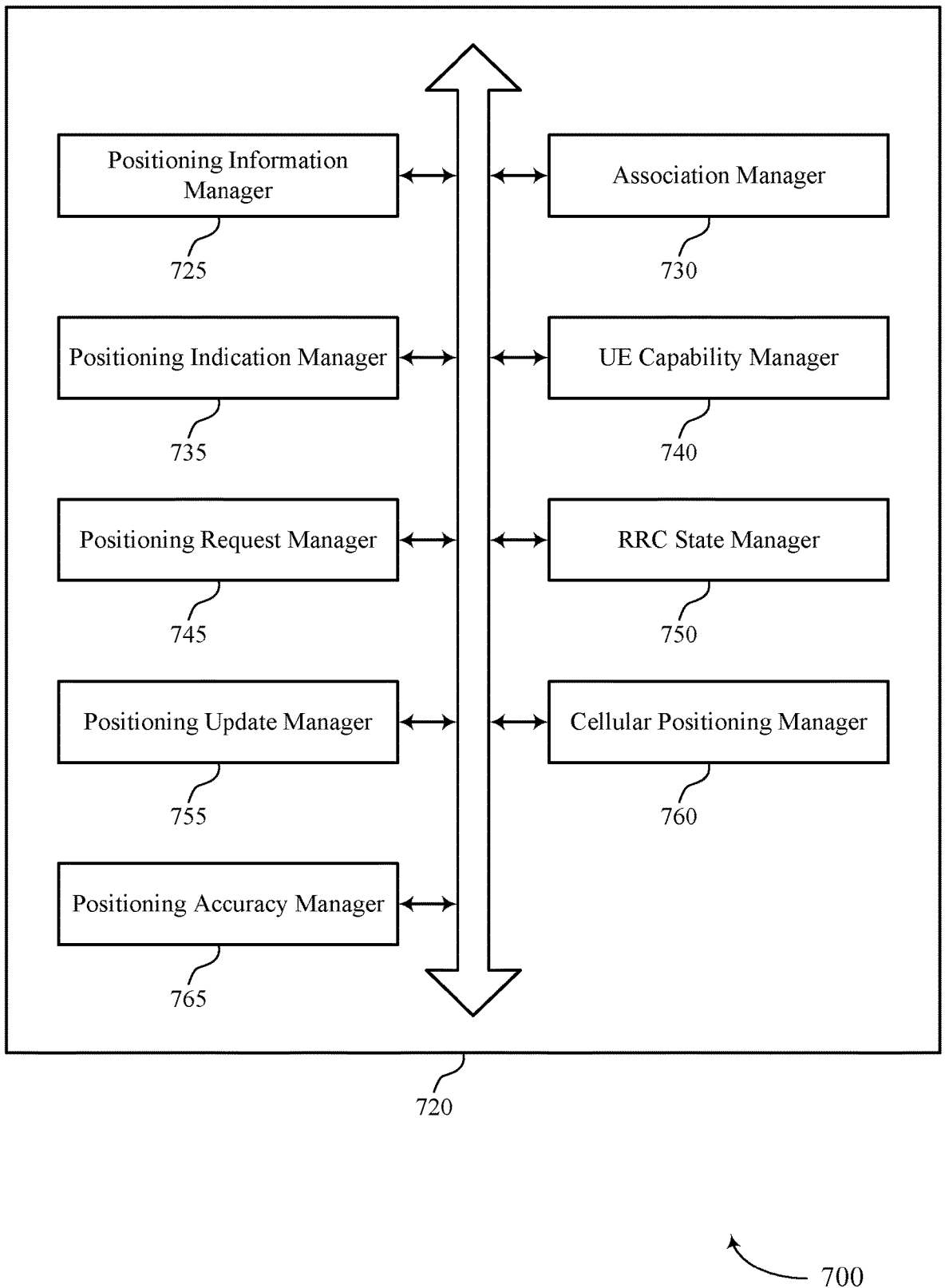
FIG. 7 shows a block diagram of a communications manager that supports sidelink-assisted cellular-based positioning in accordance with aspects of the present disclosure.

FIG. 7 shows a block diagram 700 of a communications manager 720 that supports sidelink-assisted cellular-based positioning in accordance with aspects of the present disclosure. The communications manager 720 may be an example of aspects of a communications manager 520, a communications manager 620, or both, as described herein. The communications manager 720, or various components thereof, may be an example of means for performing various aspects of sidelink-assisted cellular-based positioning as described herein. For example, the communications manager 720 may include a positioning information manager 725, an association manager 730, a positioning indication manager 735, a UE capability manager 740, a positioning request manager 745, an RRC state manager 750, a positioning update manager 755, a cellular positioning manager 760, a positioning accuracy manager 765, or any combination thereof. Each of these components may communicate, directly or indirectly, with one another (e.g., via one or more buses).

The communications manager 720 may support wireless communication at a base station in accordance with examples as disclosed herein. The positioning information manager 725 may be configured as or otherwise support a means for receiving positioning information for a first UE, the first UE supporting sidelink communications via a sidelink interface with one or more roadside units. The association manager 730 may be configured as or otherwise support a means for identifying that a second UE is associated with the first UE, the association between the first UE and the second UE satisfying a threshold and the second UE supporting sidelink-assisted positioning. The positioning indication manager 735 may be configured as or otherwise support a means for providing, to a network entity, a message indicating the positioning information for the first UE and identifying the first UE and the second UE.

In some examples, the UE capability manager 740 may be configured as or otherwise support a means for providing, to the network entity, a signal indicating that the second UE supports the sidelink-assisted positioning.

In some examples, the positioning request manager 745 may be configured as or otherwise support a means for obtaining, from the network entity, a signal indicating a request for the positioning information for the second UE, where the message indicating the positioning information is provided to the network entity based on the request.

In some examples, the RRC state manager 750 may be configured as or otherwise support a means for transmitting, to the second UE, an indication that the second UE is to remain in an idle state during positioning operations based on the association between the first UE and the second UE satisfying the threshold.

In some examples, the positioning update manager 755 may be configured as or otherwise support a means for determining that the association between the first UE and the second UE fails to satisfy the threshold. In some examples, the positioning update manager 755 may be configured as or otherwise support a means for selecting a third UE that is associated with the second UE based on the association between the third UE and the second UE satisfying the threshold.

In some examples, the positioning update manager 755 may be configured as or otherwise support a means for receiving a signal from the second UE indicating that the association between the first UE and the second UE fails to satisfy the threshold, where the signal identifies the third UE.

In some examples, the positioning update manager 755 may be configured as or otherwise support a means for providing, to the network entity, a signal identifying the third UE and indicating that the third UE is associated with the second UE.

In some examples, the cellular positioning manager 760 may be configured as or otherwise support a means for refraining from initiating a positioning procedure with the second UE based on the association with the first UE satisfying the threshold.

In some examples, the positioning accuracy manager 765 may be configured as or otherwise support a means for receiving a signal indicating a positioning accuracy for the first UE, where the association satisfying the threshold is based on the positioning accuracy of the first UE.

In some examples, the signal is received from the second UE, the first UE, a RSU associated with the first UE, or a combination thereof. In some examples, the threshold includes a proximity threshold, a positioning accuracy threshold, a travel threshold, a connection threshold, a shared connection threshold, or any combination thereof.

Figure 8:
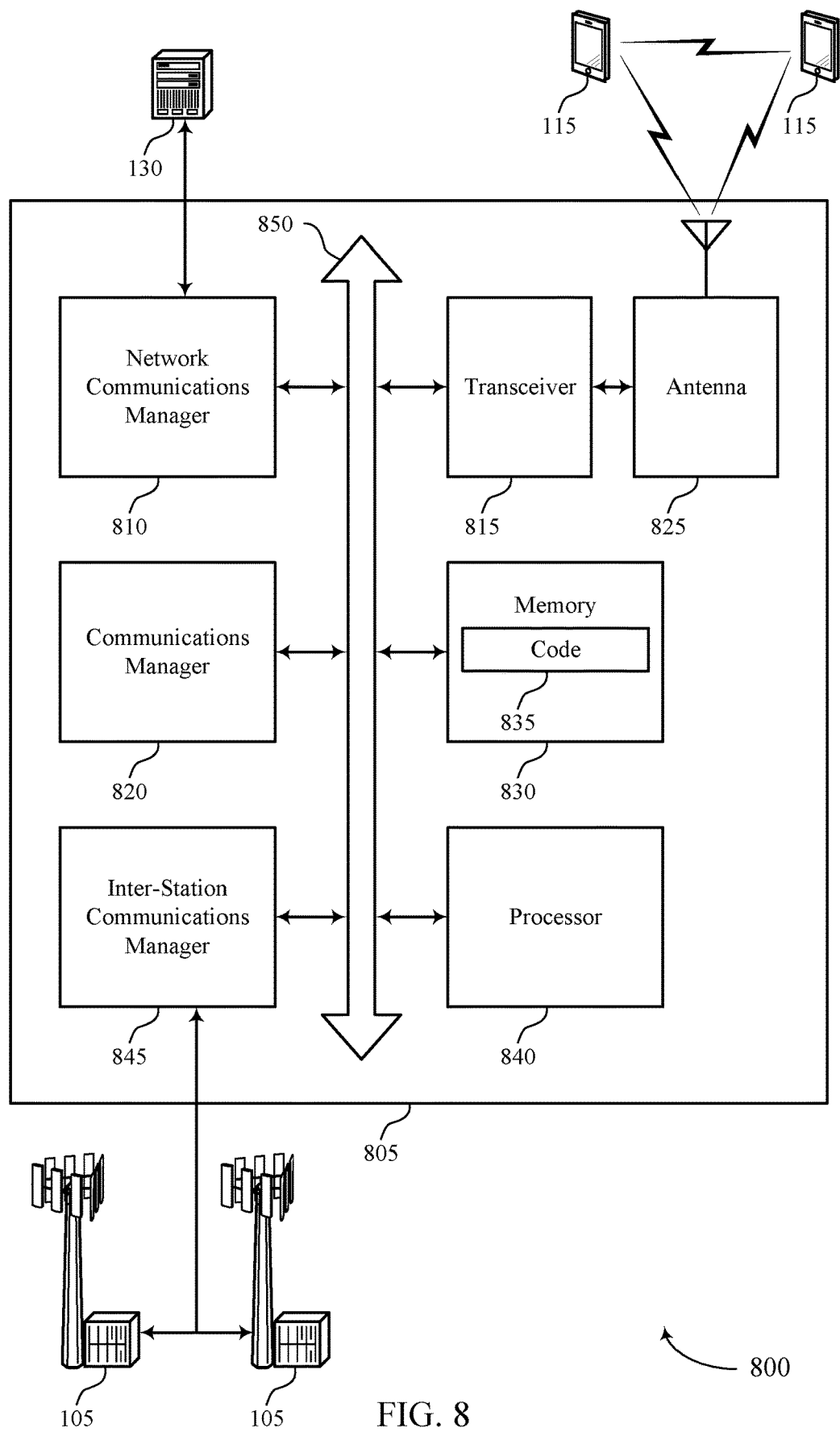
FIG. 8 shows a diagram of a system including a device that supports sidelink-assisted cellular-based positioning in accordance with aspects of the present disclosure.

FIG. 8 shows a diagram of a system 800 including a device 805 that supports sidelink-assisted cellular-based positioning in accordance with aspects of the present disclosure. The device 805 may be an example of or include the components of a device 505, a device 605, or a base station 105 as described herein. The device 805 may communicate wirelessly with one or more base stations 105, UEs 115, or any combination thereof. The device 805 may include components for bi-directional voice and data communications including components for transmitting and receiving communications, such as a communications manager 820, a network communications manager 810, a transceiver 815, an antenna 825, a memory 830, code 835, a processor 840, and an inter-station communications manager 845. These components may be in electronic communication or otherwise coupled (e.g., operatively, communicatively, functionally, electronically, electrically) via one or more buses (e.g., a bus 850).

The network communications manager 810 may manage communications with a core network 130 (e.g., via one or more wired backhaul links). For example, the network communications manager 810 may manage the transfer of data communications for client devices, such as one or more UEs 115.

In some cases, the device 805 may include a single antenna 825. However, in some other cases the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include RAM and ROM. The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a BIOS which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting sidelink-assisted cellular-based positioning). For example, the device 805 or a component of the device 805 may include a processor 840 and memory 830 coupled to the processor 840, the processor 840 and memory 830 configured to perform various functions described herein.

The inter-station communications manager 845 may manage communications with other base stations 105, and may include a controller or scheduler for controlling communications with UEs 115 in cooperation with other base stations 105. For example, the inter-station communications manager 845 may coordinate scheduling for transmissions to UEs 115 for various interference mitigation techniques such as beamforming or joint transmission. In some examples, the inter-station communications manager 845 may provide an X2 interface within an LTE/LTE-A wireless communications network technology to provide communication between base stations 105.

The communications manager 820 may support wireless communication at a base station in accordance with examples as disclosed herein. For example, the communications manager 820 may be configured as or otherwise support a means for receiving positioning information for a first UE, the first UE supporting sidelink communications via a sidelink interface with one or more roadside units. The communications manager 820 may be configured as or otherwise support a means for identifying that a second UE is associated with the first UE, the association between the first UE and the second UE satisfying a threshold and the second UE supporting sidelink-assisted positioning. The communications manager 820 may be configured as or otherwise support a means for providing, to a network entity, a message indicating the positioning information for the first UE and identifying the first UE and the second UE.

By including or configuring the communications manager 820 in accordance with examples as described herein, the device 805 may support techniques for more efficient cellular-based positioning operations that are assisted by a sidelink UE by leveraging an association between the target UE and the sidelink UE to support the positioning information of the sidelink UE for the target UE.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of sidelink-assisted cellular-based positioning as described herein, or the processor 840 and the memory 830 may be otherwise configured to perform or support such operations.

Figure 9:
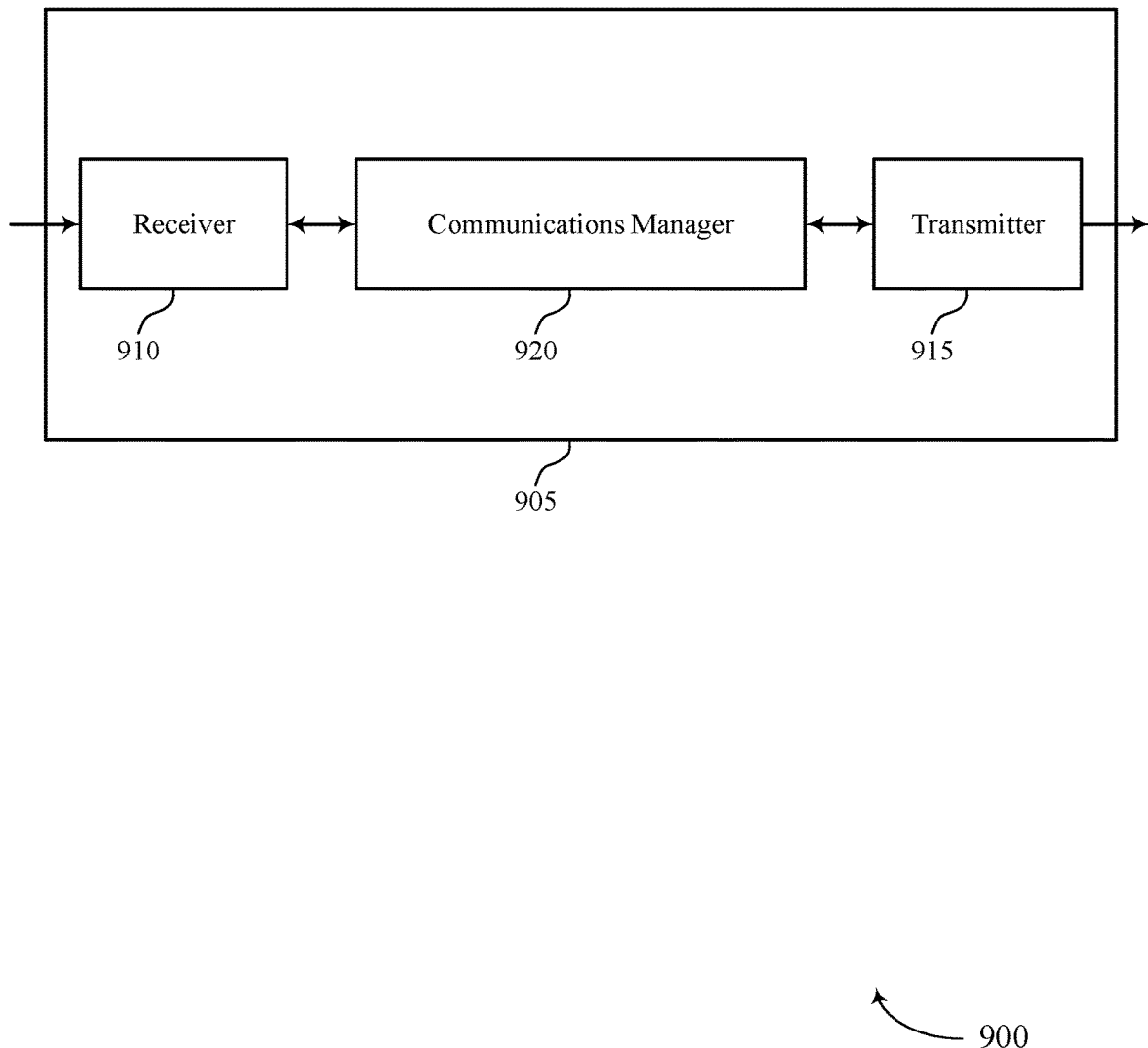
FIGS. 9 and 10 show block diagrams of devices that support sidelink-assisted cellular-based positioning in accordance with aspects of the present disclosure.

FIG. 9 shows a block diagram 900 of a device 905 that supports sidelink-assisted cellular-based positioning in accordance with aspects of the present disclosure. The device 905 may be an example of aspects of a network entity as described herein (e.g., a LMF and/or AMF). The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to sidelink-assisted cellular-based positioning). Information may be passed on to other components of the device 905. The receiver 910 may utilize a single antenna or a set of multiple antennas.

The transmitter 915 may provide a means for transmitting signals (e.g., via a backhaul network) generated by other components of the device 905. For example, the transmitter 915 may transmit information such as packets, user data, control information, or any combination thereof associated with various information channels (e.g., control channels, data channels, information channels related to sidelink-assisted cellular-based positioning). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of sidelink-assisted cellular-based positioning as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a network entity in accordance with examples as disclosed herein. For example, the communications manager 920 may be configured as or otherwise support a means for providing, to a base station, a signal indicating a request for positioning information for a first UE. The communications manager 920 may be configured as or otherwise support a means for obtaining a message indicating the positioning information for a second UE that supports sidelink communications via a sidelink interface with one or more roadside units and identifies the first UE and the second UE, where an association between the second UE and the first UE satisfies a threshold. The communications manager 920 may be configured as or otherwise support a means for determining a position of the first UE based on the positioning information for the second UE and the association between the second UE and the first UE satisfying the threshold.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for more efficient cellular-based positioning operations that are assisted by a sidelink UE by leveraging an association between the target UE and the sidelink UE to support the positioning information of the sidelink UE for the target UE.

Figure 10:
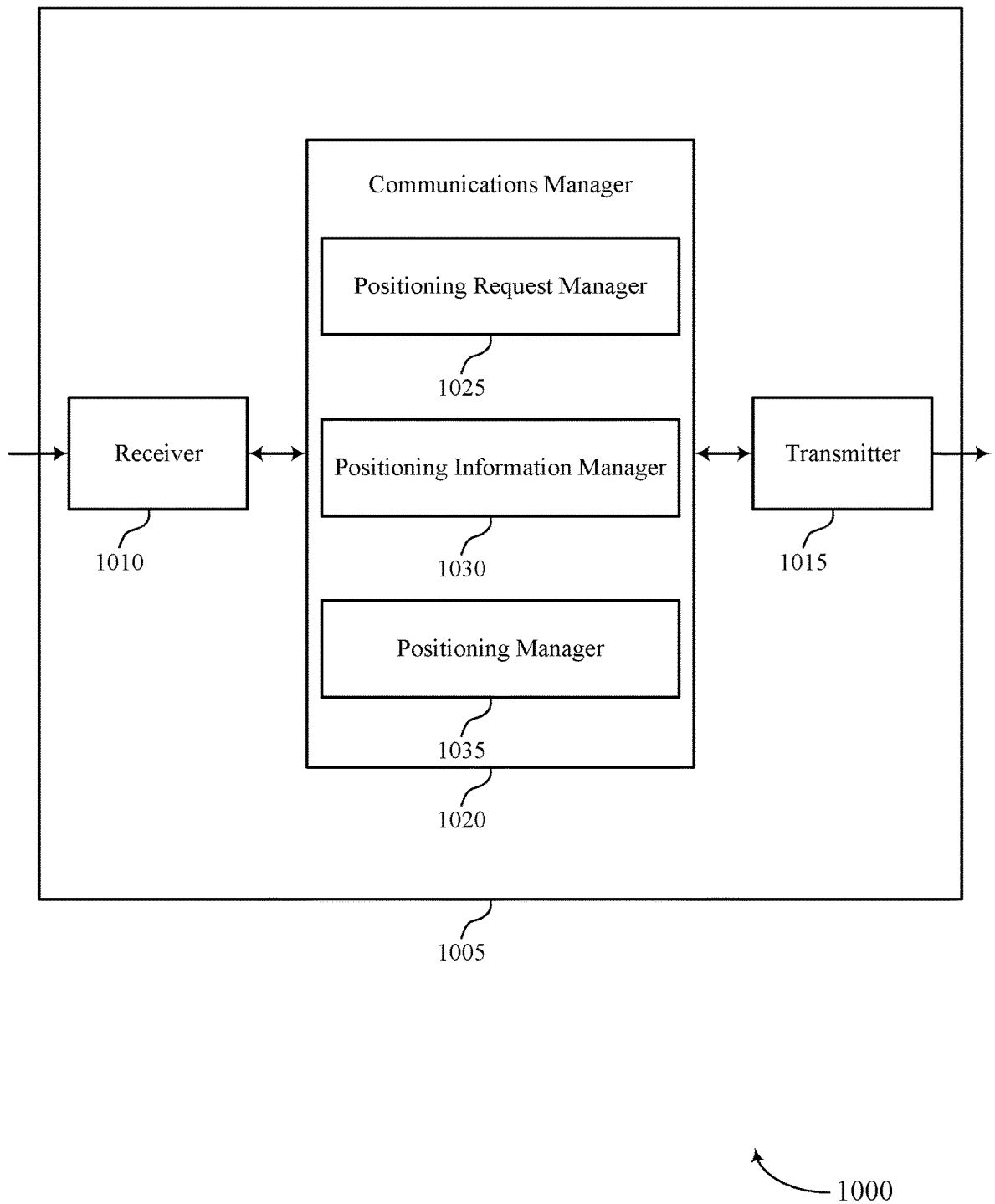

FIG. 10 shows a block diagram 1000 of a device 1005 that supports sidelink-assisted cellular-based positioning in accordance with aspects of the present disclosure. The device 1005 may be an example of aspects of a device 905 or a network entity as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to sidelink-assisted cellular-based positioning). Information may be passed on to other components of the device 1005. The receiver 1010 may utilize a single antenna or a set of multiple antennas.

The transmitter 1015 may provide a means for transmitting signals (e.g., via a backhaul network) generated by other components of the device 1005. For example, the transmitter 1015 may transmit information such as packets, user data, control information, or any combination thereof associated with various information channels (e.g., control channels, data channels, information channels related to sidelink-assisted cellular-based positioning). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of sidelink-assisted cellular-based positioning as described herein. For example, the communications manager 1020 may include a positioning request manager 1025, a positioning information manager 1030, a positioning manager 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a network entity in accordance with examples as disclosed herein. The positioning request manager 1025 may be configured as or otherwise support a means for providing, to a base station, a signal indicating a request for positioning information for a first UE. The positioning information manager 1030 may be configured as or otherwise support a means for obtaining a message indicating the positioning information for a second UE that supports sidelink communications via a sidelink interface with one or more roadside units and identifies the first UE and the second UE, where an association between the second UE and the first UE satisfies a threshold. The positioning manager 1035 may be configured as or otherwise support a means for determining a position of the first UE based on the positioning information for the second UE and the association between the second UE and the first UE satisfying the threshold.

Figure 11:
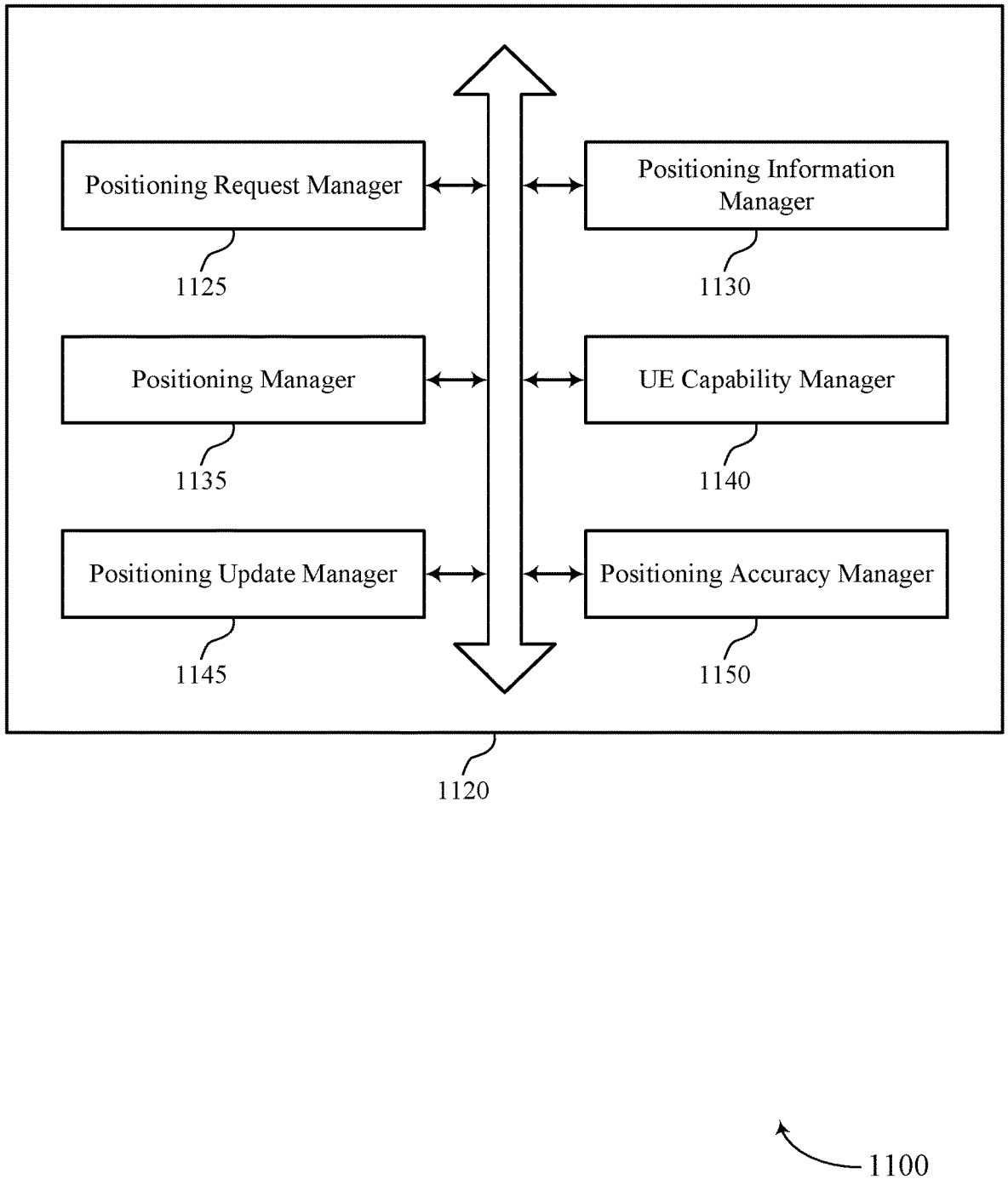
FIG. 11 shows a block diagram of a communications manager that supports sidelink-assisted cellular-based positioning in accordance with aspects of the present disclosure.

FIG. 11 shows a block diagram 1100 of a communications manager 1120 that supports sidelink-assisted cellular-based positioning in accordance with aspects of the present disclosure. The communications manager 1120 may be an example of aspects of a communications manager 920, a communications manager 1020, or both, as described herein. The communications manager 1120, or various components thereof, may be an example of means for performing various aspects of sidelink-assisted cellular-based positioning as described herein. For example, the communications manager 1120 may include a positioning request manager 1125, a positioning information manager 1130, a positioning manager 1135, a UE capability manager 1140, a positioning update manager 1145, a positioning accuracy manager 1150, or any combination thereof. Each of these components may communicate, directly or indirectly, with one another (e.g., via one or more buses).

The communications manager 1120 may support wireless communication at a network entity in accordance with examples as disclosed herein. The positioning request manager 1125 may be configured as or otherwise support a means for providing, to a base station, a signal indicating a request for positioning information for a first UE. The positioning information manager 1130 may be configured as or otherwise support a means for obtaining a message indicating the positioning information for a second UE that supports sidelink communications via a sidelink interface with one or more roadside units and identifies the first UE and the second UE, where an association between the second UE and the first UE satisfies a threshold. The positioning manager 1135 may be configured as or otherwise support a means for determining a position of the first UE based on the positioning information for the second UE and the association between the second UE and the first UE satisfying the threshold.

In some examples, the UE capability manager 1140 may be configured as or otherwise support a means for obtaining a signal indicating that the first ULE supports the sidelink-assisted positioning.

In some examples, the positioning update manager 1145 may be configured as or otherwise support a means for obtaining a signal indicating that the association between the second UE and the first UE fails to satisfy the threshold, where the signal identifies a third UE associated with the first UE and having an association that satisfies the threshold.

In some examples, the positioning accuracy manager 1150 may be configured as or otherwise support a means for determining a positioning accuracy associated with the second UE, where the association satisfying the threshold is based on the positioning accuracy of the first UE. In some examples, the threshold includes a proximity threshold, a positioning accuracy threshold, a travel threshold, a connection threshold, a shared connection threshold, or any combination thereof.

Figure 12:
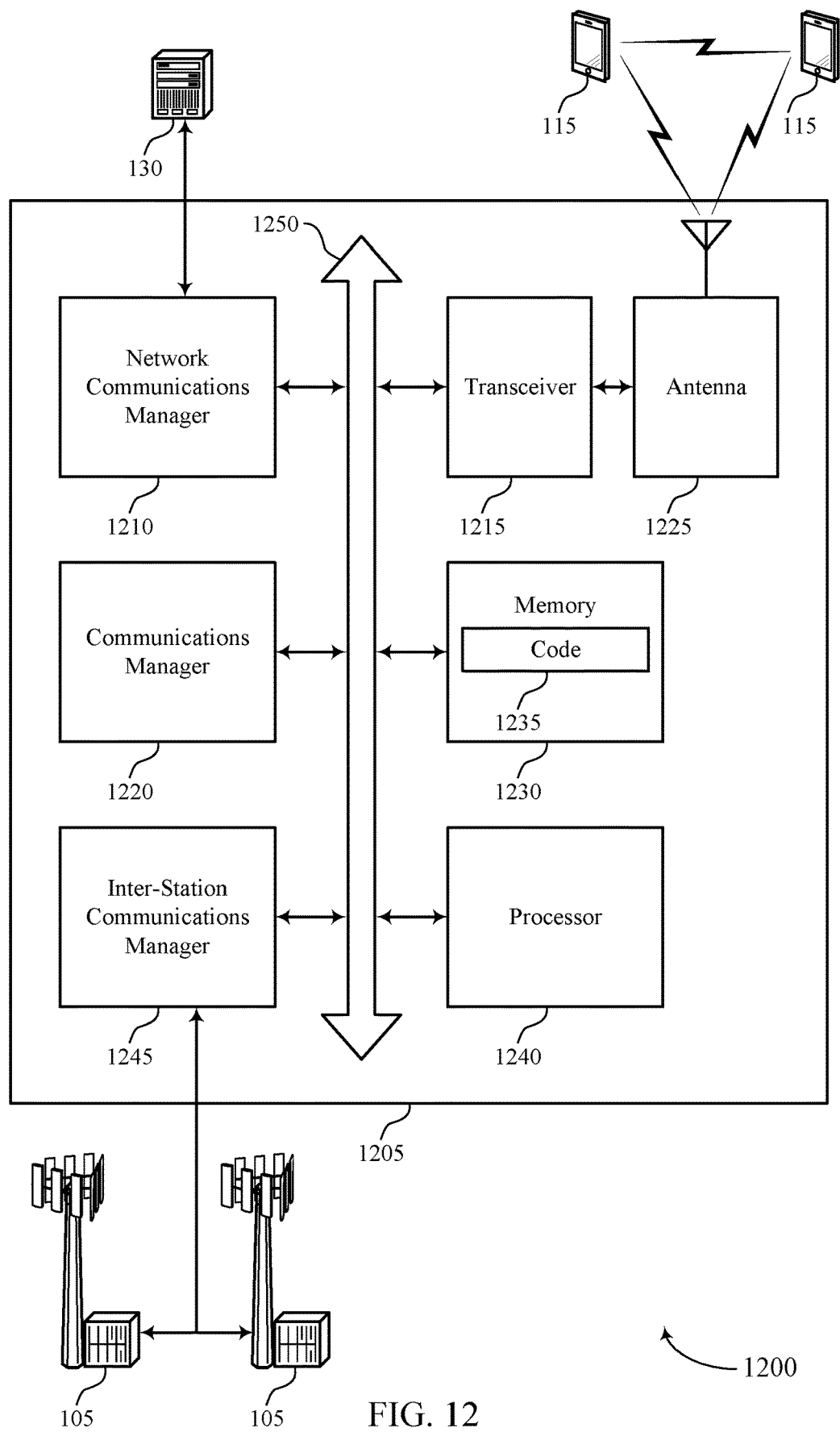
FIG. 12 shows a diagram of a system including a device that supports sidelink-assisted cellular-based positioning in accordance with aspects of the present disclosure.

FIG. 12 shows a diagram of a system 1200 including a device 1205 that supports sidelink-assisted cellular-based positioning in accordance with aspects of the present disclosure. The device 1205 may be an example of or include the components of a device 905, a device 1005, or a network entity as described herein. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting sidelink-assisted cellular-based positioning). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a network entity in accordance with examples as disclosed herein. For example, the communications manager 1220 may be configured as or otherwise support a means for providing, to a base station, a signal indicating a request for positioning information for a first UE. The communications manager 1220 may be configured as or otherwise support a means for obtaining a message indicating the positioning information for a second UE that supports sidelink communications via a sidelink interface with one or more roadside units and identifies the first UE and the second UE, where an association between the second UE and the first UE satisfies a threshold. The communications manager 1220 may be configured as or otherwise support a means for determining a position of the first UE based on the positioning information for the second UE and the association between the second UE and the first UE satisfying the threshold.

By including or configuring the communications manager 1220 in accordance with examples as described herein, the device 1205 may support techniques for more efficient cellular-based positioning operations that are assisted by a sidelink UE by leveraging an association between the target UE and the sidelink UE to support the positioning information of the sidelink UE for the target UE.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of sidelink-assisted cellular-based positioning as described herein, or the processor 1240 and the memory 1230 may be otherwise configured to perform or support such operations.

Figure 13:
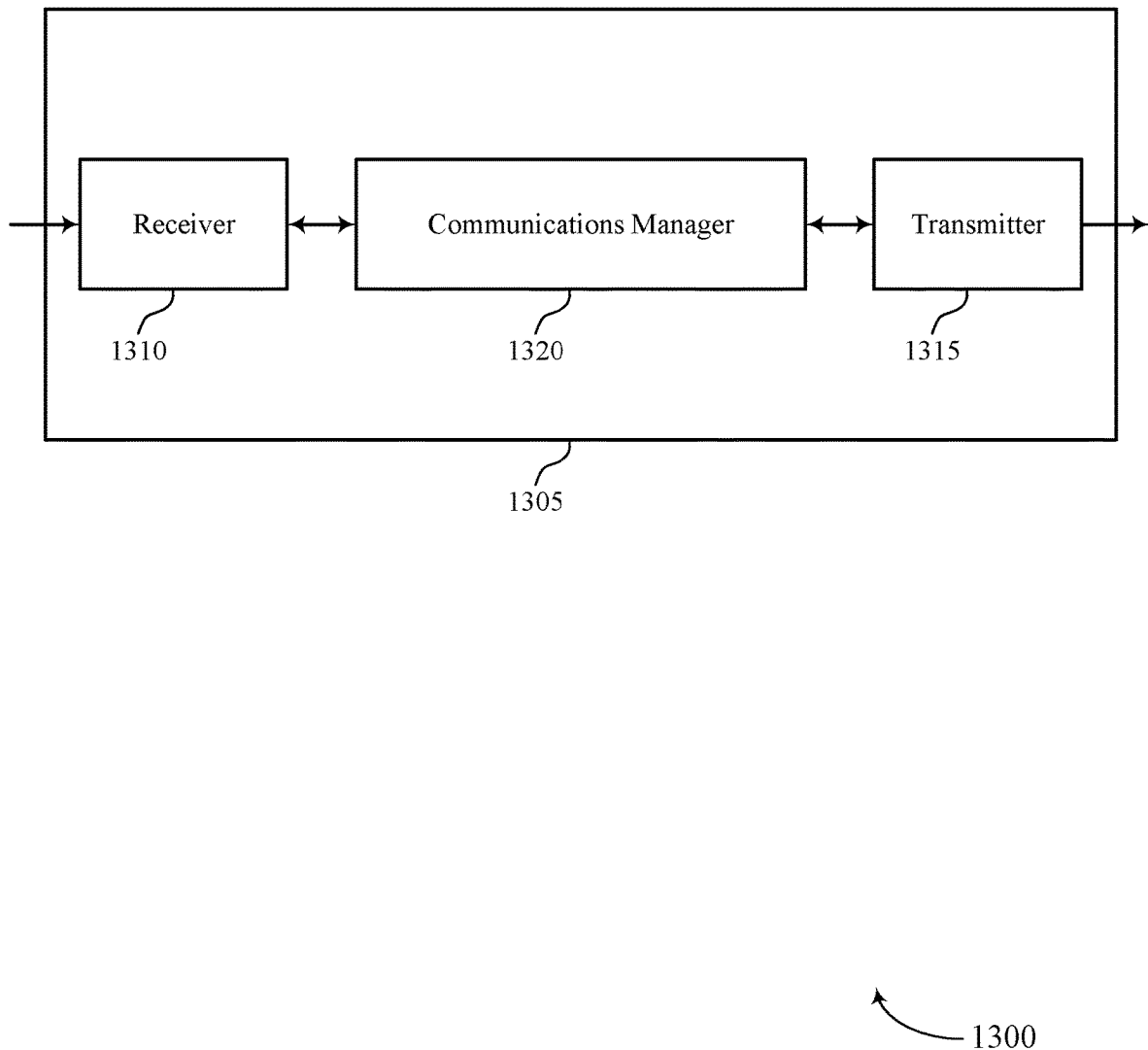
FIGS. 13 and 14 show block diagrams of devices that support sidelink-assisted cellular-based positioning in accordance with aspects of the present disclosure.

FIG. 13 shows a block diagram 1300 of a device 1305 that supports sidelink-assisted cellular-based positioning in accordance with aspects of the present disclosure. The device 1305 may be an example of aspects of a UE 115 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to sidelink-assisted cellular-based positioning). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to sidelink-assisted cellular-based positioning). In some examples, the transmitter 1315 may be co-located with a receiver 1310 in a transceiver module. The transmitter 1315 may utilize a single antenna or a set of multiple antennas.

The communications manager 1320, the receiver 1310, the transmitter 1315, or various combinations thereof or various components thereof may be examples of means for performing various aspects of sidelink-assisted cellular-based positioning as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1320 may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at a first UE in accordance with examples as disclosed herein. For example, the communications manager 1320 may be configured as or otherwise support a means for receiving, via a cellular interface, a signal indicating a request for positioning information for the first UE. The communications manager 1320 may be configured as or otherwise support a means for receiving the positioning information of a second UE associated with the first UE, the second UE communicating with the first UE via a sidelink interface and the association between the first UE and the second UE satisfying a threshold. The communications manager 1320 may be configured as or otherwise support a means for transmitting, to a network entity via a base station, a message indicating the positioning information of the second UE for the first UE, the message identifying the second UE and the first UE.

By including or configuring the communications manager 1320 in accordance with examples as described herein, the device 1305 (e.g., a processor controlling or otherwise coupled to the receiver 1310, the transmitter 1315, the communications manager 1320, or a combination thereof) may support techniques for more efficient cellular-based positioning operations that are assisted by a sidelink UE by leveraging an association between the target UE and the sidelink UE to support the positioning information of the sidelink UE for the target UE.

Figure 14:
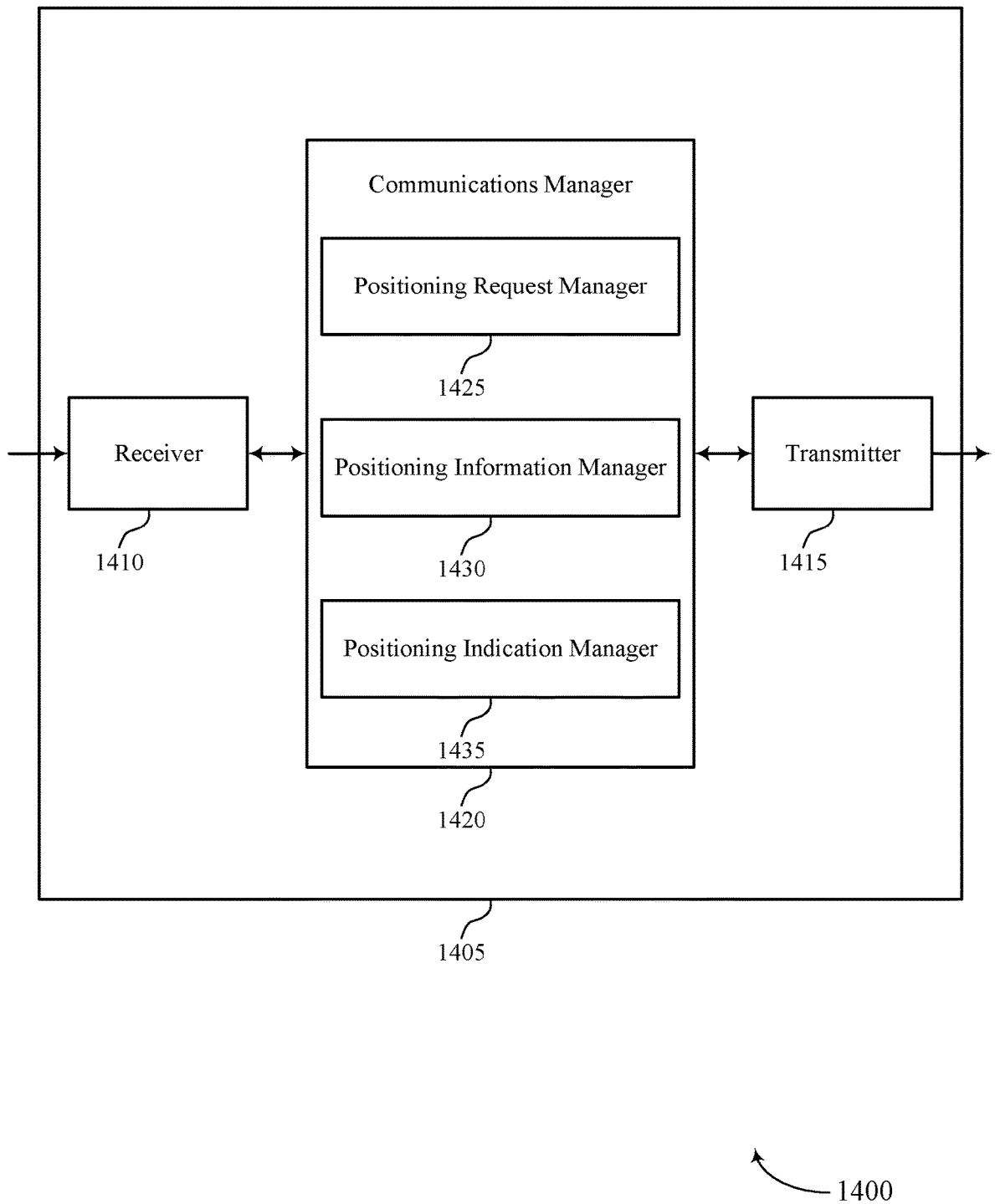

FIG. 14 shows a block diagram 1400 of a device 1405 that supports sidelink-assisted cellular-based positioning in accordance with aspects of the present disclosure. The device 1405 may be an example of aspects of a device 1305 or a UE 115 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to sidelink-assisted cellular-based positioning). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to sidelink-assisted cellular-based positioning). In some examples, the transmitter 1415 may be co-located with a receiver 1410 in a transceiver module. The transmitter 1415 may utilize a single antenna or a set of multiple antennas.

The device 1405, or various components thereof, may be an example of means for performing various aspects of sidelink-assisted cellular-based positioning as described herein. For example, the communications manager 1420 may include a positioning request manager 1425, a positioning information manager 1430, a positioning indication manager 1435, or any combination thereof. The communications manager 1420 may be an example of aspects of a communications manager 1320 as described herein. In some examples, the communications manager 1420, or various components thereof, may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communication at a first UE in accordance with examples as disclosed herein. The positioning request manager 1425 may be configured as or otherwise support a means for receiving, via a cellular interface, a signal indicating a request for positioning information for the first UE. The positioning information manager 1430 may be configured as or otherwise support a means for receiving the positioning information of a second UE associated with the first UE, the second UE communicating with the first UE via a sidelink interface and the association between the first UE and the second UE satisfying a threshold. The positioning indication manager 1435 may be configured as or otherwise support a means for transmitting, to a network entity via a base station, a message indicating the positioning information of the second UE for the first UE, the message identifying the second UE and the first UE.

Figure 15:
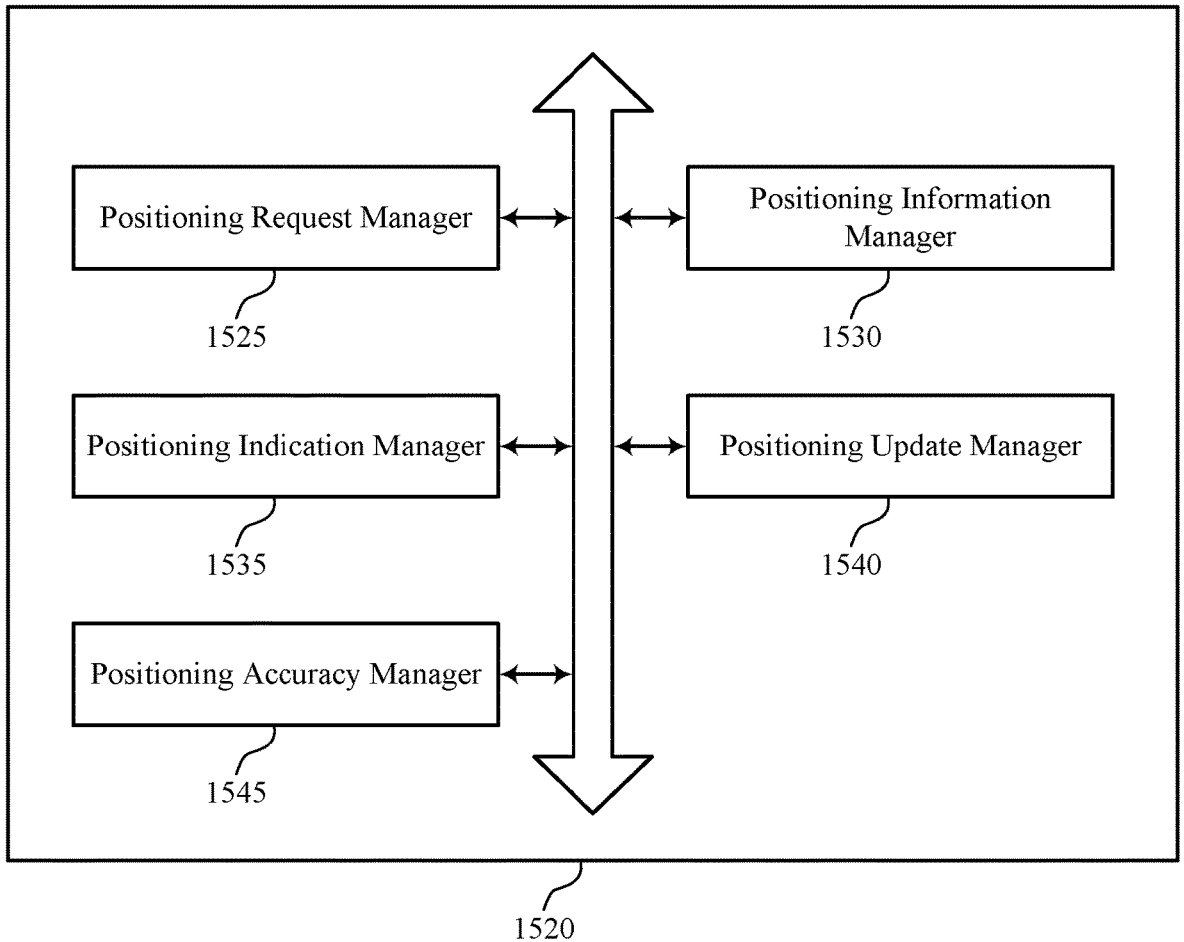
FIG. 15 shows a block diagram of a communications manager that supports sidelink-assisted cellular-based positioning in accordance with aspects of the present disclosure.

FIG. 15 shows a block diagram 1500 of a communications manager 1520 that supports sidelink-assisted cellular-based positioning in accordance with aspects of the present disclosure. The communications manager 1520 may be an example of aspects of a communications manager 1320, a communications manager 1420, or both, as described herein. The communications manager 1520, or various components thereof, may be an example of means for performing various aspects of sidelink-assisted cellular-based positioning as described herein. For example, the communications manager 1520 may include a positioning request manager 1525, a positioning information manager 1530, a positioning indication manager 1535, a positioning update manager 1540, a positioning accuracy manager 1545, or any combination thereof. Each of these components may communicate, directly or indirectly, with one another (e.g., via one or more buses).

The communications manager 1520 may support wireless communication at a first UE in accordance with examples as disclosed herein. The positioning request manager 1525 may be configured as or otherwise support a means for receiving, via a cellular interface, a signal indicating a request for positioning information for the first UE. The positioning information manager 1530 may be configured as or otherwise support a means for receiving the positioning information of a second UE associated with the first UE, the second UE communicating with the first UE via a sidelink interface and the association between the first UE and the second UE satisfying a threshold. The positioning indication manager 1535 may be configured as or otherwise support a means for transmitting, to a network entity via a base station, a message indicating the positioning information of the second UE for the first UE, the message identifying the second UE and the first UE.

In some examples, the positioning update manager 1540 may be configured as or otherwise support a means for receiving, via a cellular interface, a second signal indicating a second request for a positioning accuracy. In some examples, the positioning update manager 1540 may be configured as or otherwise support a means for determining the positioning accuracy of the second UE based on the association satisfying the threshold. In some examples, the positioning update manager 1540 may be configured as or otherwise support a means for transmitting an indication of the positioning accuracy of the second UE for the first UE responsive to the second request.

In some examples, the positioning accuracy manager 1545 may be configured as or otherwise support a means for receiving a second signal indicating a positioning accuracy of the second UE, where the association satisfying the threshold is based on the positioning accuracy of the second UE.

In some examples, the signal is received from the second UE, a RSU associated with the second UE, or a combination thereof. In some examples, the threshold includes a proximity threshold, a positioning accuracy threshold, a travel threshold, a connection threshold, a shared connection threshold, or any combination thereof.

Figure 16:
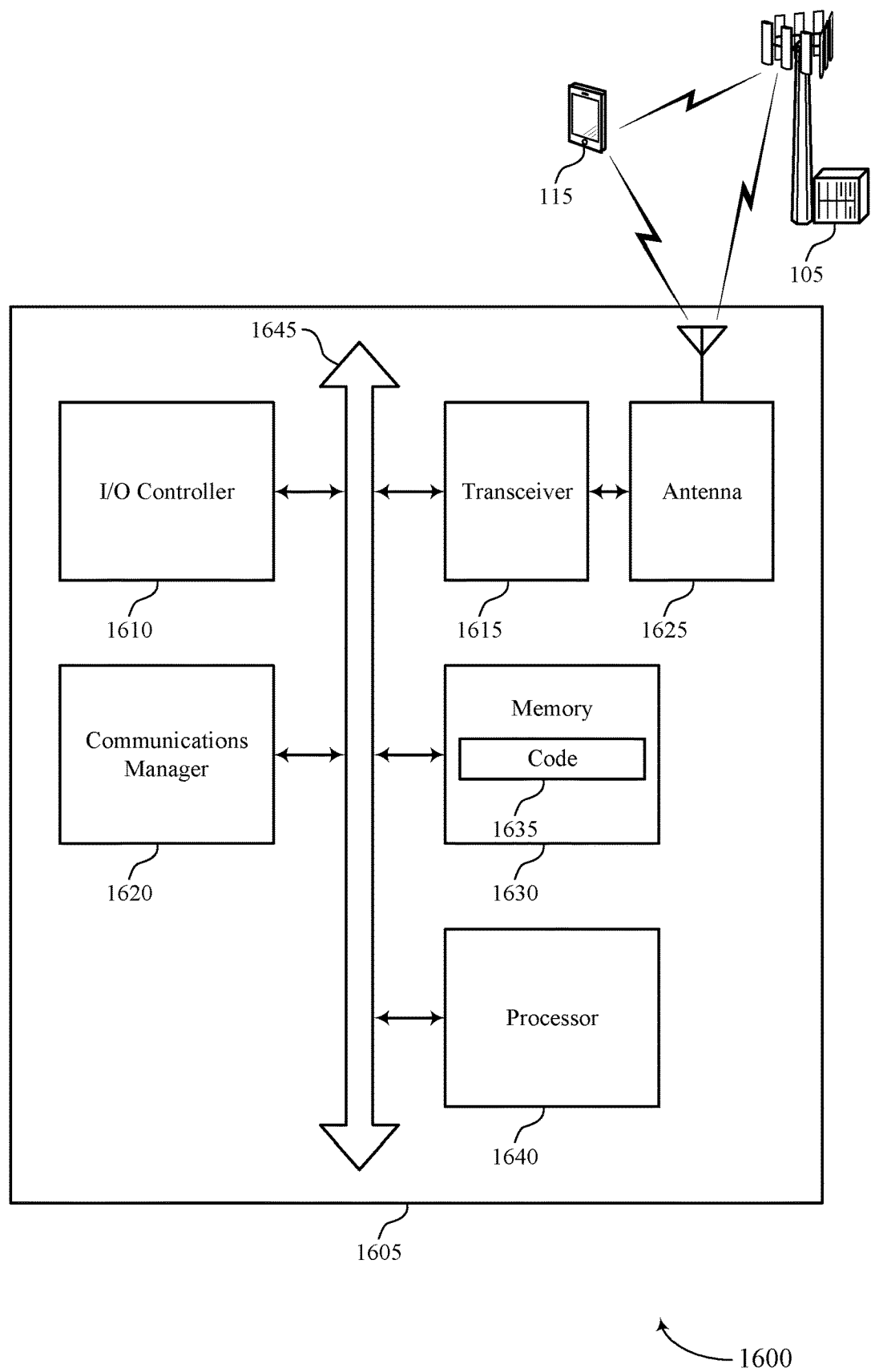
FIG. 16 shows a diagram of a system including a device that supports sidelink-assisted cellular-based positioning in accordance with aspects of the present disclosure.

FIG. 16 shows a diagram of a system 1600 including a device 1605 that supports sidelink-assisted cellular-based positioning in accordance with aspects of the present disclosure. The device 1605 may be an example of or include the components of a device 1305, a device 1405, or a UE 115 as described herein. The device 1605 may communicate wirelessly with one or more base stations 105, UEs 115, or any combination thereof. The device 1605 may include components for bi-directional voice and data communications including components for transmitting and receiving communications, such as a communications manager 1620, an input/output (I/O) controller 1610, a transceiver 1615, an antenna 1625, a memory 1630, code 1635, and a processor 1640. These components may be in electronic communication or otherwise coupled (e.g., operatively, communicatively, functionally, electronically, electrically) via one or more buses (e.g., a bus 1645).

The I/O controller 1610 may manage input and output signals for the device 1605. The I/O controller 1610 may also manage peripherals not integrated into the device 1605. In some cases, the I/O controller 1610 may represent a physical connection or port to an external peripheral. In some cases, the I/O controller 1610 may utilize an operating system such as iOS®, ANDROID®, MS-DOS®, MS-WINDOWS®, OS/2®, UNIX®, LINUX®, or another known operating system. Additionally or alternatively, the I/O controller 1610 may represent or interact with a modem, a keyboard, a mouse, a touchscreen, or a similar device. In some cases, the I/O controller 1610 may be implemented as part of a processor, such as the processor 1640. In some cases, a user may interact with the device 1605 via the I/O controller 1610 or via hardware components controlled by the I/O controller 1610.

In some cases, the device 1605 may include a single antenna 1625. However, in some other cases, the device 1605 may have more than one antenna 1625, which may be capable of concurrently transmitting or receiving multiple wireless transmissions. The transceiver 1615 may communicate bi-directionally, via the one or more antennas 1625, wired, or wireless links as described herein. For example, the transceiver 1615 may represent a wireless transceiver and may communicate bi-directionally with another wireless transceiver. The transceiver 1615 may also include a modem to modulate the packets, to provide the modulated packets to one or more antennas 1625 for transmission, and to demodulate packets received from the one or more antennas 1625. The transceiver 1615, or the transceiver 1615 and one or more antennas 1625, may be an example of a transmitter 1315, a transmitter 1415, a receiver 1310, a receiver 1410, or any combination thereof or component thereof, as described herein.

The memory 1630 may include random access memory (RAM) and read-only memory (ROM). The memory 1630 may store computer-readable, computer-executable code 1635 including instructions that, when executed by the processor 1640, cause the device 1605 to perform various functions described herein. The code 1635 may be stored in a non-transitory computer-readable medium such as system memory or another type of memory. In some cases, the code 1635 may not be directly executable by the processor 1640 but may cause a computer (e.g., when compiled and executed) to perform functions described herein. In some cases, the memory 1630 may contain, among other things, a basic I/O system (BIOS) which may control basic hardware or software operation such as the interaction with peripheral components or devices.

The processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting sidelink-assisted cellular-based positioning). For example, the device 1605 or a component of the device 1605 may include a processor 1640 and memory 1630 coupled to the processor 1640, the processor 1640 and memory 1630 configured to perform various functions described herein.

The communications manager 1620 may support wireless communication at a first UE in accordance with examples as disclosed herein. For example, the communications manager 1620 may be configured as or otherwise support a means for receiving, via a cellular interface, a signal indicating a request for positioning information for the first UE. The communications manager 1620 may be configured as or otherwise support a means for receiving the positioning information of a second UE associated with the first UE, the second UE communicating with the first UE via a sidelink interface and the association between the first UE and the second UE satisfying a threshold. The communications manager 1620 may be configured as or otherwise support a means for transmitting, to a network entity via a base station, a message indicating the positioning information of the second UE for the first UE, the message identifying the second UE and the first UE.

By including or configuring the communications manager 1620 in accordance with examples as described herein, the device 1605 may support techniques for more efficient cellular-based positioning operations that are assisted by a sidelink UE by leveraging an association between the target UE and the sidelink UE to support the positioning information of the sidelink UE for the target UE.

In some examples, the communications manager 1620 may be configured to perform various operations (e.g., receiving, monitoring, transmitting) using or otherwise in cooperation with the transceiver 1615, the one or more antennas 1625, or any combination thereof. Although the communications manager 1620 is illustrated as a separate component, in some examples, one or more functions described with reference to the communications manager 1620 may be supported by or performed by the processor 1640, the memory 1630, the code 1635, or any combination thereof. For example, the code 1635 may include instructions executable by the processor 1640 to cause the device 1605 to perform various aspects of sidelink-assisted cellular-based positioning as described herein, or the processor 1640 and the memory 1630 may be otherwise configured to perform or support such operations.

Figure 17:
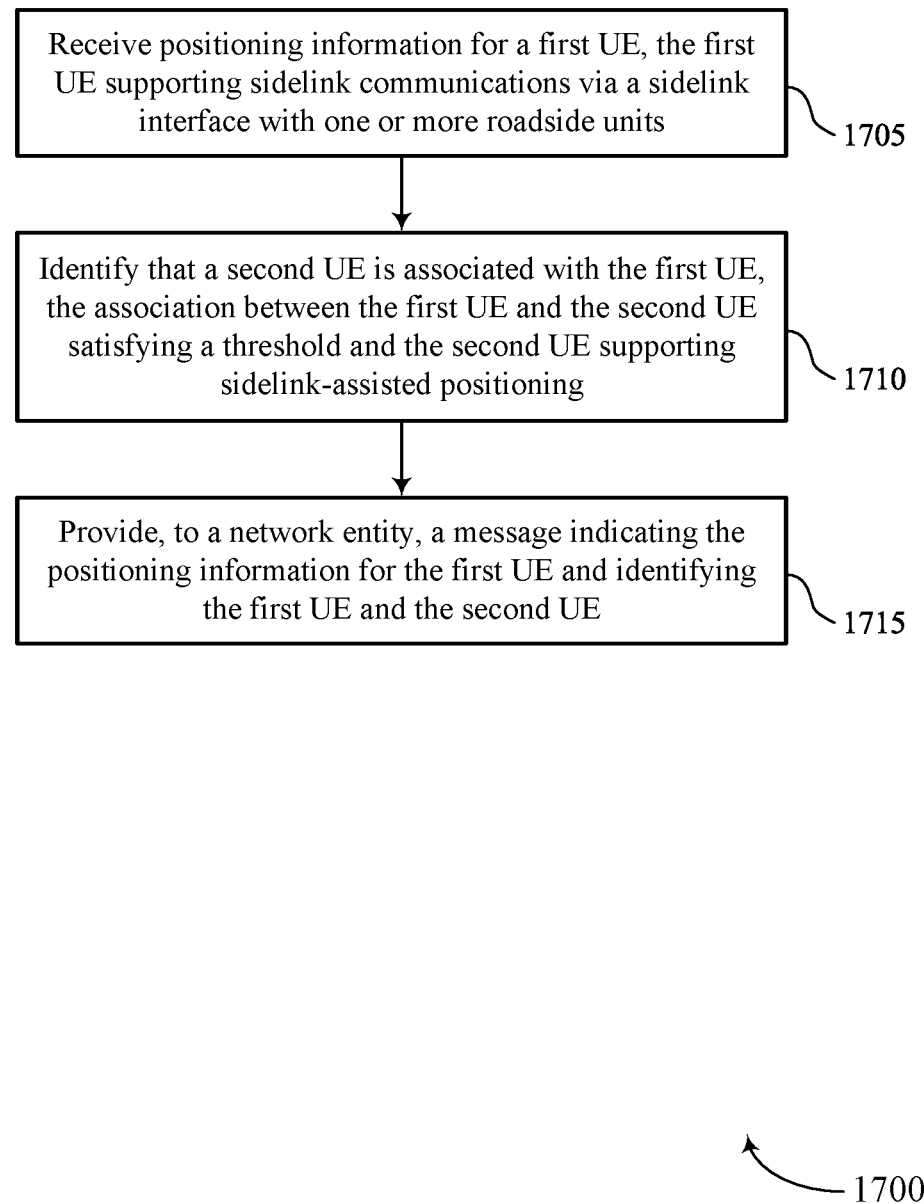
FIGS. 17 through 21 show flowcharts illustrating methods that support sidelink-assisted cellular-based positioning in accordance with aspects of the present disclosure.

FIG. 17 shows a flowchart illustrating a method 1700 that supports sidelink-assisted cellular-based positioning in accordance with aspects of the present disclosure. The operations of the method 1700 may be implemented by a base station or its components as described herein. For example, the operations of the method 1700 may be performed by a base station 105 as described with reference to FIGS. 1 through 8. In some examples, a base station may execute a set of instructions to control the functional elements of the base station to perform the described functions. Additionally or alternatively, the base station may perform aspects of the described functions using special-purpose hardware.

At 1705, the method may include receiving positioning information for a first UE, the first UE supporting sidelink communications via a sidelink interface with one or more roadside units. The operations of 1705 may be performed in accordance with examples as disclosed herein. In some examples, aspects of the operations of 1705 may be performed by a positioning information manager 725 as described with reference to FIG. 7.

At 1710, the method may include identifying that a second UE is associated with the first UE, the association between the first UE and the second UE satisfying a threshold and the second UE supporting sidelink-assisted positioning. The operations of 1710 may be performed in accordance with examples as disclosed herein. In some examples, aspects of the operations of 1710 may be performed by an association manager 730 as described with reference to FIG. 7.

At 1715, the method may include providing, to a network entity, a message indicating the positioning information for the first UE and identifying the first UE and the second UE. The operations of 1715 may be performed in accordance with examples as disclosed herein. In some examples, aspects of the operations of 1715 may be performed by a positioning indication manager 735 as described with reference to FIG. 7.

Figure 18:
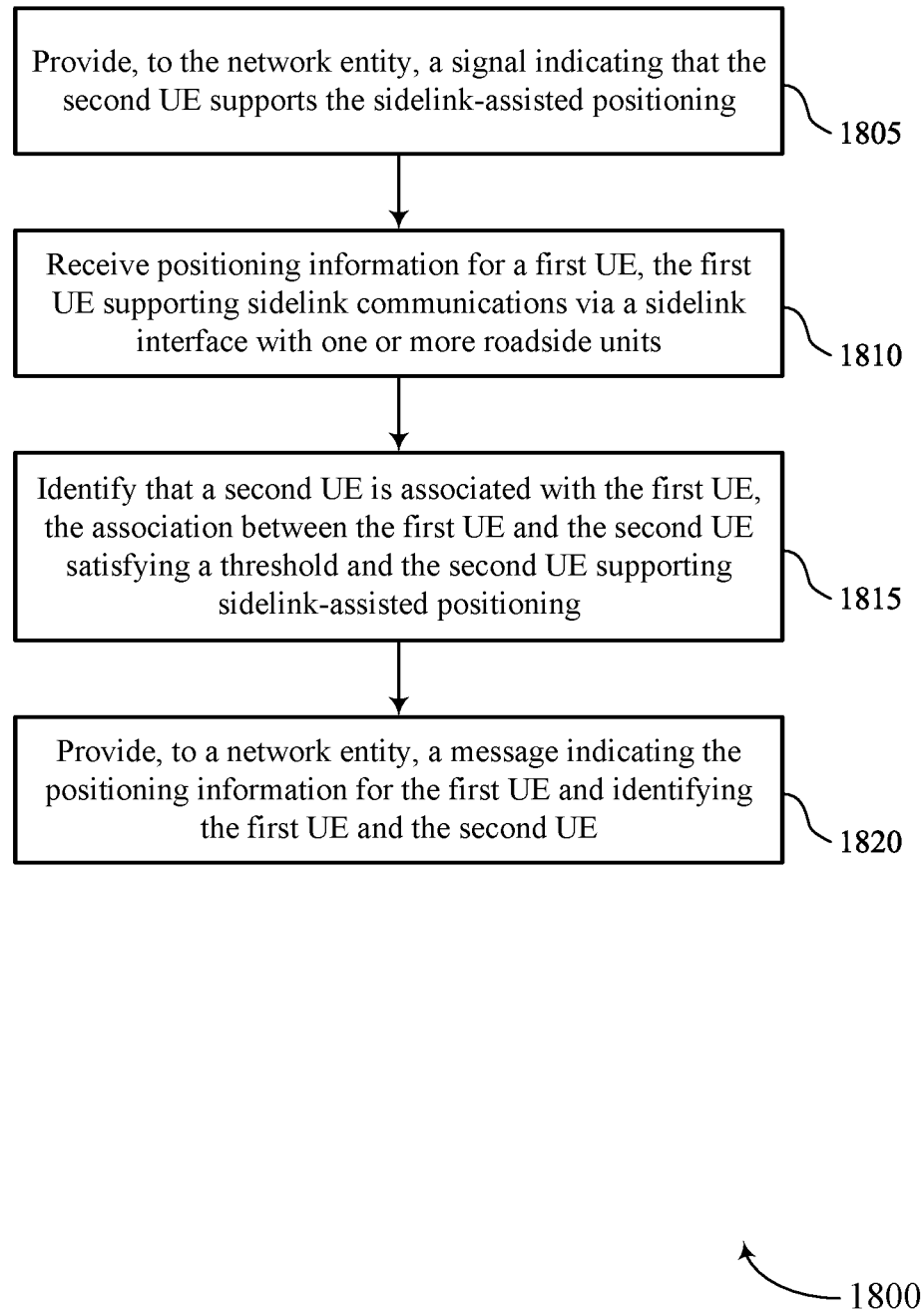

FIG. 18 shows a flowchart illustrating a method 1800 that supports sidelink-assisted cellular-based positioning in accordance with aspects of the present disclosure. The operations of the method 1800 may be implemented by a base station or its components as described herein. For example, the operations of the method 1800 may be performed by a base station 105 as described with reference to FIGS. 1 through 8. In some examples, a base station may execute a set of instructions to control the functional elements of the base station to perform the described functions. Additionally or alternatively, the base station may perform aspects of the described functions using special-purpose hardware.

At 1805, the method may include providing, to the network entity, a signal indicating that the second UE supports the sidelink-assisted positioning. The operations of 1805 may be performed in accordance with examples as disclosed herein. In some examples, aspects of the operations of 1805 may be performed by a UE capability manager 740 as described with reference to FIG. 7.

At 1810, the method may include receiving positioning information for a first UE, the first UE supporting sidelink communications via a sidelink interface with one or more roadside units. The operations of 1810 may be performed in accordance with examples as disclosed herein. In some examples, aspects of the operations of 1810 may be performed by a positioning information manager 725 as described with reference to FIG. 7.

At 1815, the method may include identifying that a second UE is associated with the first UE, the association between the first UE and the second UE satisfying a threshold and the second UE supporting sidelink-assisted positioning. The operations of 1815 may be performed in accordance with examples as disclosed herein. In some examples, aspects of the operations of 1815 may be performed by an association manager 730 as described with reference to FIG. 7.

At 1820, the method may include providing, to a network entity, a message indicating the positioning information for the first UE and identifying the first UE and the second UE. The operations of 1820 may be performed in accordance with examples as disclosed herein. In some examples, aspects of the operations of 1820 may be performed by a positioning indication manager 735 as described with reference to FIG. 7.

Figure 19:
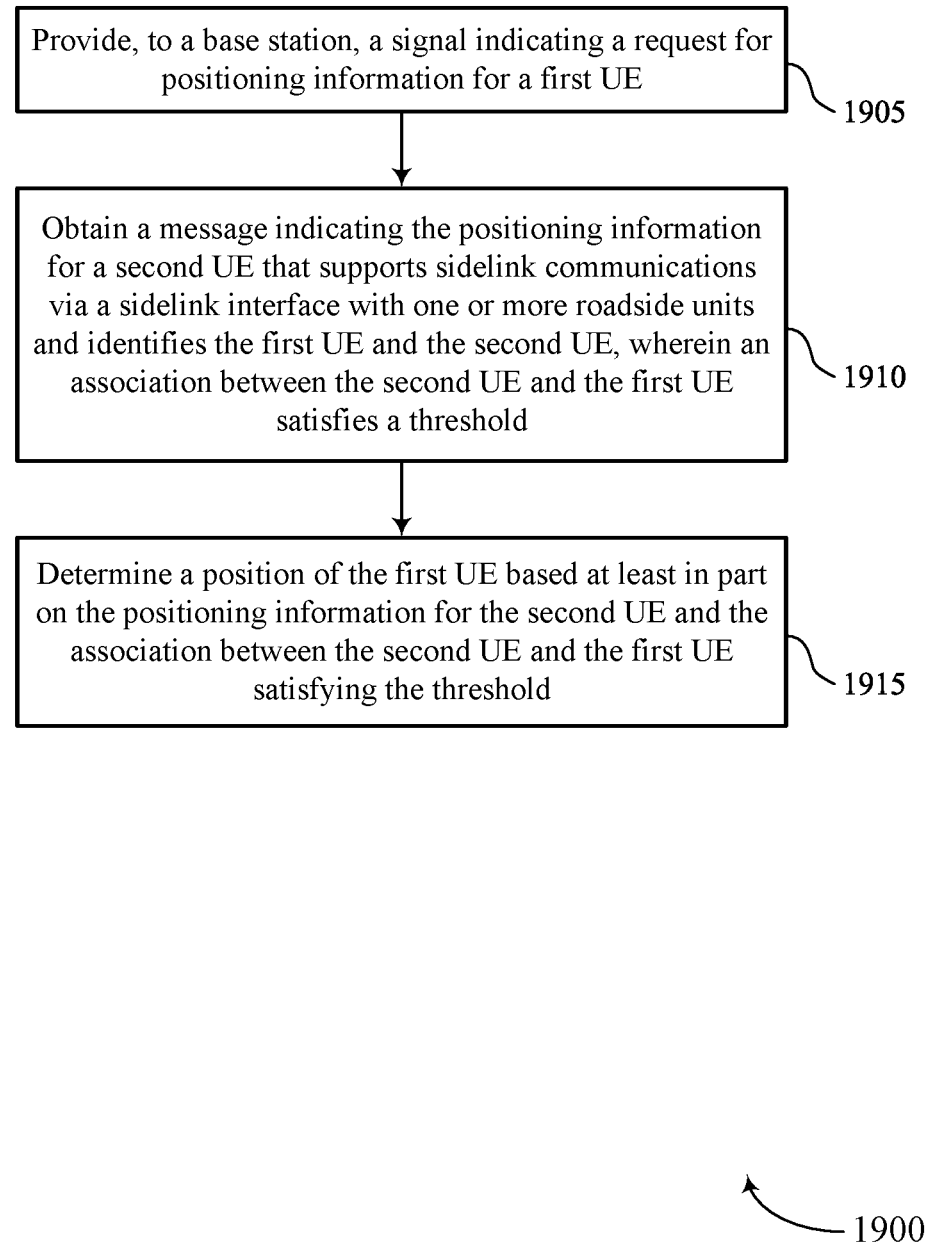

FIG. 19 shows a flowchart illustrating a method 1900 that supports sidelink-assisted cellular-based positioning in accordance with aspects of the present disclosure. The operations of the method 1900 may be implemented by a Network Entity—ALPHA or its components as described herein. For example, the operations of the method 1900 may be performed by a Network Entity—ALPHA as described with reference to FIGS. 1 through 4 and 9 through 12. In some examples, a Network Entity—ALPHA may execute a set of instructions to control the functional elements of the Network Entity—ALPHA to perform the described functions. Additionally or alternatively, the Network Entity—ALPHA may perform aspects of the described functions using special-purpose hardware.

At 1905, the method may include providing, to a base station, a signal indicating a request for positioning information for a first UE. The operations of 1905 may be performed in accordance with examples as disclosed herein. In some examples, aspects of the operations of 1905 may be performed by a positioning request manager 1125 as described with reference to FIG. 11.

At 1910, the method may include obtaining a message indicating the positioning information for a second UE that supports sidelink communications via a sidelink interface with one or more roadside units and identifies the first UE and the second UE, where an association between the second UE and the first UE satisfies a threshold. The operations of 1910 may be performed in accordance with examples as disclosed herein. In some examples, aspects of the operations of 1910 may be performed by a positioning information manager 1130 as described with reference to FIG. 11.

At 1915, the method may include determining a position of the first UE based on the positioning information for the second UE and the association between the second UE and the first UE satisfying the threshold. The operations of 1915 may be performed in accordance with examples as disclosed herein. In some examples, aspects of the operations of 1915 may be performed by a positioning manager 1135 as described with reference to FIG. 11.

Figure 20:
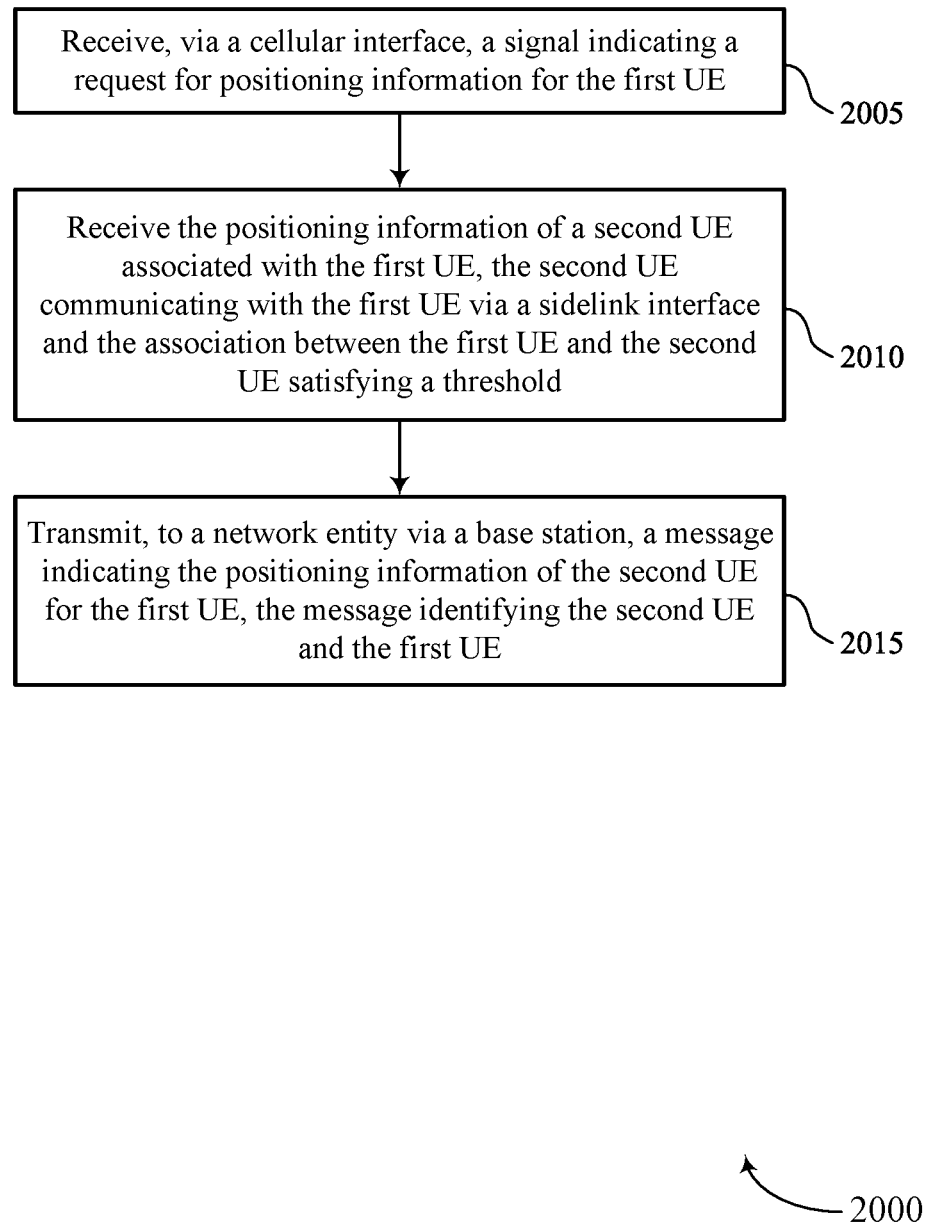

FIG. 20 shows a flowchart illustrating a method 2000 that supports sidelink-assisted cellular-based positioning in accordance with aspects of the present disclosure. The operations of the method 2000 may be implemented by a UE or its components as described herein. For example, the operations of the method 2000 may be performed by a UE 115 as described with reference to FIGS. 1 through 4 and 13 through 16. In some examples, a UE may execute a set of instructions to control the functional elements of the UE to perform the described functions. Additionally or alternatively, the UE may perform aspects of the described functions using special-purpose hardware.

At 2005, the method may include receiving, via a cellular interface, a signal indicating a request for positioning information for the first UE. The operations of 2005 may be performed in accordance with examples as disclosed herein. In some examples, aspects of the operations of 2005 may be performed by a positioning request manager 1525 as described with reference to FIG. 15.

At 2010, the method may include receiving the positioning information of a second UE associated with the first UE, the second UE communicating with the first UE via a sidelink interface and the association between the first UE and the second UE satisfying a threshold. The operations of 2010 may be performed in accordance with examples as disclosed herein. In some examples, aspects of the operations of 2010 may be performed by a positioning information manager 1530 as described with reference to FIG. 15.

At 2015, the method may include transmitting, to a network entity via a base station, a message indicating the positioning information of the second UE for the first UE, the message identifying the second UE and the first UE. The operations of 2015 may be performed in accordance with examples as disclosed herein. In some examples, aspects of the operations of 2015 may be performed by a positioning indication manager 1535 as described with reference to FIG. 15.

Figure 21:
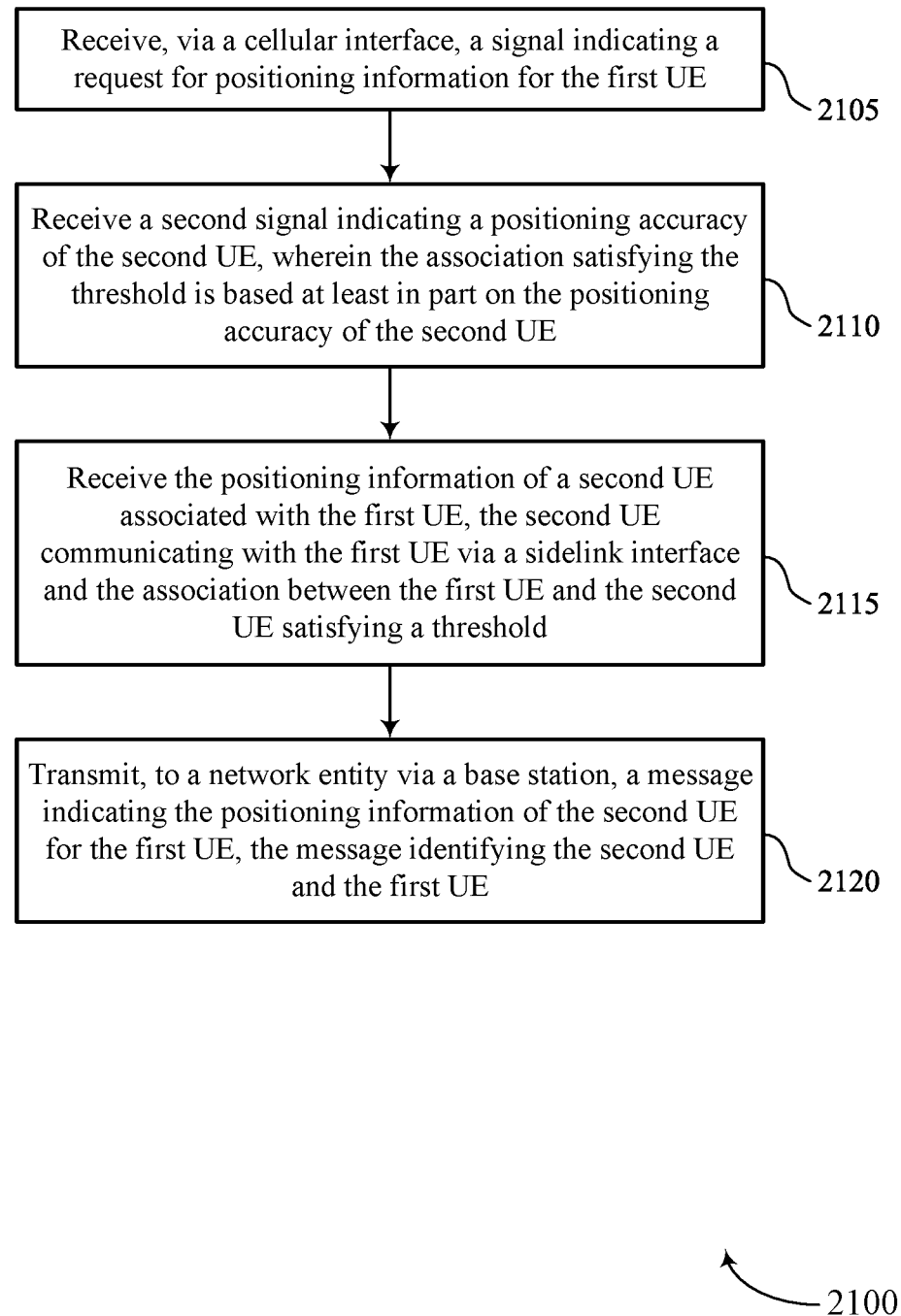

FIG. 21 shows a flowchart illustrating a method 2100 that supports sidelink-assisted cellular-based positioning in accordance with aspects of the present disclosure. The operations of the method 2100 may be implemented by a UE or its components as described herein. For example, the operations of the method 2100 may be performed by a UE 115 as described with reference to FIGS. 1 through 4 and 13 through 16. In some examples, a UE may execute a set of instructions to control the functional elements of the UE to perform the described functions. Additionally or alternatively, the UE may perform aspects of the described functions using special-purpose hardware.

At 2105, the method may include receiving, via a cellular interface, a signal indicating a request for positioning information for the first UE. The operations of 2105 may be performed in accordance with examples as disclosed herein. In some examples, aspects of the operations of 2105 may be performed by a positioning request manager 1525 as described with reference to FIG. 15.

At 2110, the method may include receiving a second signal indicating a positioning accuracy of the second UE, where the association satisfying the threshold is based on the positioning accuracy of the second UE. The operations of 2110 may be performed in accordance with examples as disclosed herein. In some examples, aspects of the operations of 2110 may be performed by a positioning accuracy manager 1545 as described with reference to FIG. 15.

At 2115, the method may include receiving the positioning information of a second UE associated with the first UE, the second UE communicating with the first UE via a sidelink interface and the association between the first UE and the second UE satisfying a threshold. The operations of 2115 may be performed in accordance with examples as disclosed herein. In some examples, aspects of the operations of 2115 may be performed by a positioning information manager 1530 as described with reference to FIG. 15.

At 2120, the method may include transmitting, to a network entity via a base station, a message indicating the positioning information of the second UE for the first UE, the message identifying the second UE and the first UE. The operations of 2120 may be performed in accordance with examples as disclosed herein. In some examples, aspects of the operations of 2120 may be performed by a positioning indication manager 1535 as described with reference to FIG. 15.

The following provides an overview of aspects of the present disclosure:

Aspect 1: A method for wireless communication at a base station, comprising: receiving positioning information for a first UE, the first UE supporting sidelink communications via a sidelink interface with one or more RSUs; identifying that a second UE is associated with the first UE, the association between the first UE and the second UE satisfying a threshold and the second UE supporting sidelink-assisted positioning; and providing, to a network entity, a message indicating the positioning information for the first UE and identifying the first UE and the second UE.

Aspect 2: The method of aspect 1, further comprising: providing, to the network entity, a signal indicating that the second UE supports the sidelink-assisted positioning.

Aspect 3: The method of any of aspects 1 through 2, further comprising: obtaining, from the network entity, a signal indicating a request for the positioning information for the second UE, wherein the message indicating the positioning information is provided to the network entity based at least in part on the request.

Aspect 4: The method of any of aspects 1 through 3, further comprising: transmitting, to the second UE, an indication that the second UE is to remain in an idle state during positioning operations based at least in part on the association between the first UE and the second UE satisfying the threshold.

Aspect 5: The method of any of aspects 1 through 4, further comprising: determining that the association between the first UE and the second UE fails to satisfy the threshold; and selecting a third UE that is associated with the second UE based at least in part on the association between the third UE and the second UE satisfying the threshold.

Aspect 6: The method of aspect 5, further comprising: receiving a signal from the second UE indicating that the association between the first UE and the second UE fails to satisfy the threshold, wherein the signal identifies the third UE.

Aspect 7: The method of any of aspects 5 through 6, further comprising: providing, to the network entity, a signal identifying the third UE and indicating that the third UE is associated with the second UE.

Aspect 8: The method of any of aspects 1 through 7, further comprising: refraining from initiating a positioning procedure with the second UE based at least in part on the association with the first UE satisfying the threshold.

Aspect 9: The method of any of aspects 1 through 8, further comprising: receiving a signal indicating a positioning accuracy for the first UE, wherein the association satisfying the threshold is based at least in part on the positioning accuracy of the first UE.

Aspect 10: The method of aspect 9, wherein the signal is received from the second UE, the first UE, a RSU associated with the first UE, or a combination thereof.

Aspect 11: The method of any of aspects 1 through 10, wherein the threshold comprises a proximity threshold, a positioning accuracy threshold, a travel threshold, a connection threshold, a shared connection threshold, or any combination thereof.

Aspect 12: A method for wireless communication at a network entity, comprising: providing, to a base station, a signal indicating a request for positioning information for a first UE; obtaining a message indicating the positioning information for a second UE that supports sidelink communications via a sidelink interface with one or more RSUs and identifies the first UE and the second UE, wherein an association between the second UE and the first UE satisfies a threshold; and determining a position of the first UE based at least in part on the positioning information for the second UE and the association between the second UE and the first UE satisfying the threshold.

Aspect 13: The method of aspect 12, further comprising: obtaining a signal indicating that the first UE supports the sidelink-assisted positioning.

Aspect 14: The method of any of aspects 12 through 13, further comprising: obtaining a signal indicating that the association between the second UE and the first UE fails to satisfy the threshold, wherein the signal identifies a third UE associated with the first UE and having an association that satisfies the threshold.

Aspect 15: The method of any of aspects 12 through 14, further comprising: determining a positioning accuracy associated with the second UE, wherein the association satisfying the threshold is based at least in part on the positioning accuracy of the first UE.

Aspect 16: The method of any of aspects 12 through 15, wherein the threshold comprises a proximity threshold, a positioning accuracy threshold, a travel threshold, a connection threshold, a shared connection threshold, or any combination thereof.

Aspect 17: A method for wireless communication at a first UE, comprising: receiving, via a cellular interface, a signal indicating a request for positioning information for the first UE; receiving the positioning information of a second UE associated with the first UE, the second UE communicating with the first UE via a sidelink interface and the association between the first UE and the second UE satisfying a threshold; and transmitting, to a network entity via a base station, a message indicating the positioning information of the second UE for the first UE, the message identifying the second UE and the first UE.

Aspect 18: The method of aspect 17, further comprising: receiving, via a cellular interface, a second signal indicating a second request for a positioning accuracy; determining the positioning accuracy of the second UE based at least in part on the association satisfying the threshold; and transmitting an indication of the positioning accuracy of the second UE for the first UE responsive to the second request.

Aspect 19: The method of any of aspects 17 through 18, further comprising: receiving a second signal indicating a positioning accuracy of the second UE, wherein the association satisfying the threshold is based at least in part on the positioning accuracy of the second UE.

Aspect 20: The method of aspect 19, wherein the signal is received from the second UE, a RSU associated with the second UE, or a combination thereof.

Aspect 21: The method of any of aspects 17 through 20, wherein the threshold comprises a proximity threshold, a positioning accuracy threshold, a travel threshold, a connection threshold, a shared connection threshold, or any combination thereof.

Aspect 22: An apparatus for wireless communication at a base station, comprising a processor; memory coupled with the processor; and instructions stored in the memory and executable by the processor to cause the apparatus to perform a method of any of aspects 1 through 11.

Aspect 23: An apparatus for wireless communication at a base station, comprising at least one means for performing a method of any of aspects 1 through 11.

Aspect 24: A non-transitory computer-readable medium storing code for wireless communication at a base station, the code comprising instructions executable by a processor to perform a method of any of aspects 1 through 11.

Aspect 25: An apparatus for wireless communication at a network entity, comprising a processor; memory coupled with the processor; and instructions stored in the memory and executable by the processor to cause the apparatus to perform a method of any of aspects 12 through 16.

Aspect 26: An apparatus for wireless communication at a network entity, comprising at least one means for performing a method of any of aspects 12 through 16.

Aspect 27: A non-transitory computer-readable medium storing code for wireless communication at a network entity, the code comprising instructions executable by a processor to perform a method of any of aspects 12 through 16.

Aspect 28: An apparatus for wireless communication at a first UE, comprising a processor; memory coupled with the processor; and instructions stored in the memory and executable by the processor to cause the apparatus to perform a method of any of aspects 17 through 21.

Aspect 29: An apparatus for wireless communication at a first UE, comprising at least one means for performing a method of any of aspects 17 through 21.

Aspect 30: A non-transitory computer-readable medium storing code for wireless communication at a first UE, the code comprising instructions executable by a processor to perform a method of any of aspects 17 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a base station, comprising:
    receiving positioning information for a first user equipment (UE), the first UE supporting sidelink communications via a sidelink interface with one or more roadside units;
    identifying that a second UE is associated with the first UE, the second UE supporting sidelink-assisted positioning, if an association between the first UE and the second UE satisfies a threshold;
    selecting a third UE that is associated with the second UE based at least in part on an association between the second UE and the third UE satisfying the threshold, upon determining that the association between the first UE and the second UE fails to satisfy the threshold; and
    providing, to a network entity, a message indicating the positioning information for the first UE and identifying the first UE and the second UE or the third UE, depending on if the association between the first UE and the second UE or the association between the second UE and the third UE satisfies the threshold.

2. The method of claim 1, further comprising:
    providing, to the network entity, a signal indicating that the second UE supports the sidelink-assisted positioning.

3. The method of claim 1, further comprising:
    obtaining, from the network entity, a signal indicating a request for the positioning information for the second UE, wherein the message indicating the positioning information is provided to the network entity based at least in part on the request.

4. The method of claim 1, further comprising:
    transmitting, to the second UE, an indication that the second UE is to remain in an idle state during positioning operations based at least in part on the association between the first UE and the second UE satisfying the threshold.

5. The method of claim 1, further comprising:
    receiving a signal from the second UE indicating that the association between the first UE and the second UE fails to satisfy the threshold, wherein the signal identifies the third UE.

6. The method of claim 1, further comprising:
    providing, to the network entity, a signal identifying the third UE and indicating that the third UE is associated with the second UE.

7. The method of claim 1, further comprising:
    refraining from initiating a positioning procedure with the second UE based at least in part on the association with the first UE satisfying the threshold.

8. The method of claim 1, further comprising:
    receiving a signal indicating a positioning accuracy for the first UE, wherein the association satisfying the threshold is based at least in part on the positioning accuracy of the first UE.

9. The method of claim 8, wherein the signal is received from the second UE, the first UE, a roadside unit (RSU) associated with the first UE, or a combination thereof.

10. The method of claim 1, wherein the threshold comprises a proximity threshold, a positioning accuracy threshold, a travel threshold, a connection threshold, a shared connection threshold, or any combination thereof.

11. A method for wireless communication at a network entity, comprising:
    providing, to a base station, a signal indicating a request for positioning information for a first user equipment (UE);
    obtaining a message indicating the positioning information for a second UE that supports sidelink communications via a sidelink interface with one or more roadside units and identifies the first UE and the second UE, if an association between the second UE and the first UE satisfies a threshold;
    obtaining a signal indicating that a third UE associated with the first UE and an association between the first UE and the third UE satisfies the threshold if the association between the second UE and the first UE fails to satisfy the threshold; and
    determining a position of the first UE based at least in part on the positioning information for the second UE and the association between the second UE and the first UE satisfying the threshold.

12. The method of claim 11, further comprising:
    obtaining a signal indicating that the first UE supports the sidelink-assisted positioning.

13. The method of claim 11, further comprising:
    determining a positioning accuracy associated with the second UE, wherein the association satisfying the threshold is based at least in part on the positioning accuracy of the first UE.

14. The method of claim 11, wherein the threshold comprises a proximity threshold, a positioning accuracy threshold, a travel threshold, a connection threshold, a shared connection threshold, or any combination thereof.

15. A method for wireless communication at a first user equipment (UE), comprising:
    receiving, via a cellular interface, a signal indicating a request for positioning information for the first UE;
    receiving the positioning information of a second UE associated with the first UE, the second UE communicating with the first UE via a sidelink interface and the association between the first UE and the second UE satisfying a threshold;

transmitting, to a network entity via a base station, a message indicating the positioning information of the second UE for the first UE, the message identifying the second UE and the first UE;

receiving, via a cellular interface, a second signal indicating a second request for a positioning accuracy;

determining the positioning accuracy of the second UE based at least in part on the association satisfying the threshold; and transmitting an indication of the positioning accuracy of the second UE for the first UE responsive to the second request.

16. The method of claim 15, further comprising:

receiving a second signal indicating a positioning accuracy of the second UE, wherein the association satisfying the threshold is based at least in part on the positioning accuracy of the second UE.

17. The method of claim 16, wherein the signal is received from the second UE, a roadside unit (RSU) associated with the second UE, or a combination thereof.

18. The method of claim 15, wherein the threshold comprises a proximity threshold, a positioning accuracy threshold, a travel threshold, a connection threshold, a shared connection threshold, or any combination thereof.

19. An apparatus for wireless communication at a first user equipment (UE), comprising:

a processor;

memory coupled with the processor; and instructions stored in the memory and executable by the processor to cause the apparatus to:

receive, via a cellular interface, a signal indicating a request for positioning information for the first UE;

receive the positioning information of a second UE associated with the first UE, the second UE communicating with the first UE via a sidelink interface and the association between the first UE and the second UE satisfying a threshold;

transmit, to a network entity via a base station, a message indicating the positioning information of the second UE for the first UE, the message identifying the second UE and the first UE;

receive, via a cellular interface, a second signal indicating a second request for a positioning accuracy;

determine the positioning accuracy of the second UE based at least in part on the association satisfying the threshold; and transmit an indication of the positioning accuracy of the second UE for the first UE responsive to the second request.

20. The apparatus of claim 19, wherein the instructions are further executable by the processor to cause the apparatus to:

receive a second signal indicating a positioning accuracy of the second UE, wherein the association satisfying the threshold is based at least in part on the positioning accuracy of the second UE.

21. The apparatus of claim 20, wherein the signal is received from the second UE, a roadside unit (RSU) associated with the second UE, or a combination thereof.

22. The apparatus of claim 19, wherein the threshold comprises a proximity threshold, a positioning accuracy threshold, a travel threshold, a connection threshold, a shared connection threshold, or any combination thereof.

* * * * *